US008343608B2

(12) United States Patent
Natarajan et al.

(10) Patent No.: US 8,343,608 B2
(45) Date of Patent: *Jan. 1, 2013

(54) USE OF APPENDED DYES IN OPTICAL DATA STORAGE MEDIA

(75) Inventors: Arunkumar Natarajan, Niskayuna, NY (US); Evgenia Mikhailovna Kim, Ballston Lake, NY (US); Vicki Herzl Watkins, Alplaus, NY (US); Julia Lam Lee, Niskayuna, NY (US); Patrick Joseph McCloskey, Waterviliet, NY (US); Kwok Pong Chan, Troy, NY (US); Matthew Jeremiah Misner, Delanson, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/873,024

(22) Filed: Aug. 31, 2010

(65) Prior Publication Data

US 2012/0052232 A1 Mar. 1, 2012

(51) Int. Cl.
*B32B 3/02* (2006.01)
*G11B 7/24* (2006.01)
*G03H 1/04* (2006.01)

(52) U.S. Cl. ............... 428/64.4; 428/64.8; 430/1; 430/2; 430/270.15; 359/3

(58) Field of Classification Search ............... 428/64.4, 428/64.8; 430/1, 2, 270.14, 270.15; 359/3
See application file for complete search history.

(56) References Cited

U.S. PATENT DOCUMENTS

| | | | |
|---|---|---|---|
| 4,151,175 | A | 4/1979 | Crivello et al. |
| 4,238,394 | A | 12/1980 | Crivello et al. |
| 4,374,066 | A | 2/1983 | Crivello et al. |
| 4,399,071 | A | 8/1983 | Crivello et al. |
| 4,442,197 | A | 4/1984 | Crivello et al. |
| 4,450,360 | A | 5/1984 | Crivello et al. |
| 4,529,490 | A | 7/1985 | Crivello et al. |
| 4,683,317 | A | 7/1987 | Crivello et al. |
| 4,780,511 | A | 10/1988 | Crivello et al. |
| 4,840,977 | A | 6/1989 | Crivello et al. |
| 4,882,201 | A | 11/1989 | Crivello et al. |
| 4,895,967 | A | 1/1990 | Crivello et al. |
| 4,981,881 | A | 1/1991 | Crivello et al. |
| 4,992,571 | A | 2/1991 | Fukuyama et al. |
| 5,037,861 | A | 8/1991 | Crivello et al. |
| 5,079,293 | A | 1/1992 | Alsamarraie et al. |
| 5,086,124 | A | 2/1992 | Fukuyama et al. |
| 5,087,662 | A | 2/1992 | Alsmarraie et al. |

(Continued)

OTHER PUBLICATIONS

Bron et al. "Near-IR two-photon induced polymerizations using either benzophenone or thioxanthone-based photoinitiators", Polym. Prep. 2001, 42, p. 675-676.*

(Continued)

*Primary Examiner* — Gerard Higgins
(74) *Attorney, Agent, or Firm* — Fletcher Yoder, P.C.

(57) ABSTRACT

The present disclosure relates to optical media and the formation and use of such media. In certain embodiments the optical media or a composition suitable for such media includes a polymeric matrix or substrate. A dye, such as an energy transfer dye is chemically appended to the polymeric matrix or substrate, such as by one or more covalent bonds.

21 Claims, 9 Drawing Sheets

U.S. PATENT DOCUMENTS

| | | | |
|---|---|---|---|
| 5,106,908 A | 4/1992 | Alsmarraie et al. | |
| 5,128,431 A | 7/1992 | Riding et al. | |
| 5,223,356 A * | 6/1993 | Kumar et al. | 430/1 |
| 5,256,728 A | 10/1993 | Dardaris et al. | |
| 5,310,619 A | 5/1994 | Crivello et al. | |
| 5,326,661 A * | 7/1994 | Sansone et al. | 430/20 |
| 5,354,796 A | 10/1994 | Creecy et al. | |
| 5,362,607 A | 11/1994 | Crivello et al. | |
| 5,405,956 A | 4/1995 | Hay et al. | |
| 5,412,061 A | 5/1995 | King, Jr. et al. | |
| 5,414,057 A | 5/1995 | Campbell et al. | |
| 5,430,199 A | 7/1995 | Caruso et al. | |
| 5,446,172 A | 8/1995 | Crivello et al. | |
| 5,459,226 A | 10/1995 | King, Jr. et al. | |
| 5,466,777 A | 11/1995 | Caruso et al. | |
| 5,475,156 A | 12/1995 | Caruso et al. | |
| 5,504,177 A | 4/1996 | King, Jr. et al. | |
| 5,504,184 A | 4/1996 | Caruso et al. | |
| 5,516,566 A | 5/1996 | Hay et al. | |
| 5,521,275 A | 5/1996 | McCloskey et al. | |
| 5,554,770 A | 9/1996 | Caruso et al. | |
| 5,556,936 A | 9/1996 | King, Jr. et al. | |
| 5,567,802 A | 10/1996 | McCloskey | |
| 5,567,829 A | 10/1996 | Caruso et al. | |
| 5,597,887 A | 1/1997 | King, Jr. et al. | |
| 5,650,470 A | 7/1997 | McCloskey et al. | |
| 5,652,312 A | 7/1997 | Phelps et al. | |
| 5,672,776 A | 9/1997 | McCloskey et al. | |
| 5,756,843 A | 5/1998 | McCloskey et al. | |
| 5,756,859 A | 5/1998 | McCloskey et al. | |
| 5,763,686 A | 6/1998 | McCloskey et al. | |
| 5,777,063 A | 7/1998 | Gordon et al. | |
| 5,830,988 A | 11/1998 | Chan | |
| 5,856,422 A | 1/1999 | Chan et al. | |
| 5,863,992 A | 1/1999 | McCloskey et al. | |
| 5,883,194 A | 3/1999 | Saito et al. | |
| 5,883,218 A | 3/1999 | Gordon et al. | |
| 5,886,073 A | 3/1999 | McCloskey et al. | |
| 5,948,876 A | 9/1999 | Mestanza et al. | |
| 5,969,086 A | 10/1999 | Webb et al. | |
| 5,973,102 A | 10/1999 | McCloskey et al. | |
| 5,977,265 A | 11/1999 | McCloskey et al. | |
| 5,981,788 A | 11/1999 | Ofori et al. | |
| 5,994,596 A | 11/1999 | Chan et al. | |
| 6,022,943 A | 2/2000 | Inoue et al. | |
| 6,087,468 A | 7/2000 | Hoeks et al. | |
| 6,091,879 A | 7/2000 | Chan et al. | |
| 6,103,827 A | 8/2000 | Saito et al. | |
| 6,140,457 A | 10/2000 | LeGrand et al. | |
| 6,143,859 A | 11/2000 | Chatterjee et al. | |
| 6,184,334 B1 | 2/2001 | McCloskey et al. | |
| 6,184,335 B1 | 2/2001 | McCloskey et al. | |
| 6,191,224 B1 | 2/2001 | Chan et al. | |
| 6,194,120 B1 | 2/2001 | Chan et al. | |
| 6,228,973 B1 | 5/2001 | McCloskey et al. | |
| 6,252,013 B1 | 6/2001 | Banach et al. | |
| 6,252,035 B1 | 6/2001 | McCloskey et al. | |
| 6,262,218 B1 | 7/2001 | Inoue et al. | |
| 6,268,435 B1 | 7/2001 | Chan et al. | |
| 6,288,206 B1 | 9/2001 | Stewart et al. | |
| 6,300,460 B1 | 10/2001 | McCloskey et al. | |
| 6,303,695 B1 | 10/2001 | Chan et al. | |
| 6,303,737 B1 | 10/2001 | Lemmon et al. | |
| 6,303,835 B1 | 10/2001 | Shafer et al. | |
| 6,316,578 B1 | 11/2001 | McCloskey et al. | |
| 6,323,304 B1 | 11/2001 | Lemmon et al. | |
| 6,333,394 B1 | 12/2001 | Bailey et al. | |
| 6,335,998 B2 | 1/2002 | Wagoner et al. | |
| 6,339,138 B1 | 1/2002 | van Hout et al. | |
| 6,376,640 B1 | 4/2002 | Lemmon et al. | |
| 6,399,739 B1 | 6/2002 | McCloskey et al. | |
| 6,403,754 B1 | 6/2002 | McCloskey et al. | |
| 6,414,106 B1 | 7/2002 | Smigelski, Jr. et al. | |
| 6,420,512 B1 | 7/2002 | McCloskey et al. | |
| 6,420,588 B1 | 7/2002 | McCloskey et al. | |
| 6,437,082 B1 | 8/2002 | McCracken et al. | |
| 6,444,756 B2 | 9/2002 | Chan et al. | |
| 6,466,729 B1 | 10/2002 | Wagoner et al. | |
| 6,469,192 B1 | 10/2002 | Burnell et al. | |
| 6,489,399 B1 | 12/2002 | Chan et al. | |
| 6,492,485 B1 | 12/2002 | Gohr et al. | |
| 6,506,871 B1 | 1/2003 | Silvi et al. | |
| 6,518,391 B1 | 2/2003 | McCloskey et al. | |
| 6,539,278 B1 | 3/2003 | Feldman et al. | |
| 6,548,623 B2 | 4/2003 | Brunelle et al. | |
| 6,562,433 B1 | 5/2003 | Ishida et al. | |
| 6,569,985 B2 | 5/2003 | McCloskey et al. | |
| 6,576,801 B2 | 6/2003 | Smigelski, Jr. et al. | |
| 6,576,911 B1 | 6/2003 | Potyrailo et al. | |
| 6,600,004 B1 | 7/2003 | McCloskey et al. | |
| 6,608,678 B1 | 8/2003 | Potyrailo et al. | |
| 6,611,649 B2 | 8/2003 | Chan et al. | |
| 6,681,073 B2 | 1/2004 | Chan et al. | |
| 6,683,689 B2 | 1/2004 | Potyrailo et al. | |
| 6,723,823 B2 | 4/2004 | McCloskey et al. | |
| 6,785,461 B2 | 8/2004 | Chan | |
| 6,790,929 B2 | 9/2004 | Silvi et al. | |
| 6,795,201 B2 | 9/2004 | Rangarajan et al. | |
| 6,797,802 B2 | 9/2004 | McCloskey et al. | |
| 6,809,817 B2 | 10/2004 | Potyrailo et al. | |
| 6,870,025 B2 | 3/2005 | McCloskey et al. | |
| 6,887,969 B2 | 5/2005 | Day et al. | |
| 6,891,015 B2 | 5/2005 | Burnell et al. | |
| 6,900,283 B2 | 5/2005 | Ramesh et al. | |
| 6,960,641 B2 | 11/2005 | O'Neil et al. | |
| RE38,995 E | 2/2006 | McCloskey et al. | |
| 7,041,775 B2 | 5/2006 | Martinez et al. | |
| 7,115,700 B2 | 10/2006 | Cella et al. | |
| 7,132,498 B2 | 11/2006 | McCloskey et al. | |
| 7,183,371 B2 | 2/2007 | Hidalgo et al. | |
| 7,189,869 B2 | 3/2007 | Hidalgo et al. | |
| 7,211,641 B2 | 5/2007 | Shafer et | |
| 7,230,066 B2 | 6/2007 | Khouri et al. | |
| 7,459,263 B2 * | 12/2008 | Farid et al. | 430/270.11 |
| 7,482,423 B2 | 1/2009 | Jansen et al. | |
| 7,498,399 B2 | 3/2009 | Buckley et al. | |
| 7,498,400 B2 | 3/2009 | Jansen et al. | |
| RE40,697 E | 4/2009 | Silvi et al. | |
| 7,514,147 B2 | 4/2009 | Davis et al. | |
| 7,521,505 B2 | 4/2009 | Venkata et al. | |
| 7,528,214 B2 | 5/2009 | Chatterjee et al. | |
| 7,541,420 B2 | 6/2009 | Berndsen et al. | |
| 7,642,315 B2 | 1/2010 | Davis et al. | |
| 7,645,851 B2 | 1/2010 | Berndsen et al. | |
| 7,649,073 B2 | 1/2010 | Davis et al. | |
| 7,760,614 B2 | 7/2010 | Peters et al. | |
| 7,802,274 B2 | 9/2010 | Wisnudel et al. | |
| 7,915,332 B2 | 3/2011 | Chan et al. | |
| 7,928,154 B2 | 4/2011 | Chan et al. | |
| 7,928,155 B2 | 4/2011 | Cao et al. | |
| 8,178,261 B2 * | 5/2012 | Natarajan et al. | 430/1 |
| 8,182,967 B2 * | 5/2012 | Natarajan et al. | 430/1 |
| 2001/0016106 A1 | 8/2001 | Wagoner et al. | |
| 2001/0053822 A1 | 12/2001 | Chan et al. | |
| 2002/0131757 A1 | 9/2002 | Chan et al. | |
| 2002/0141726 A1 | 10/2002 | Chan et al. | |
| 2002/0168170 A1 | 11/2002 | Chan | |
| 2003/0139529 A1 | 7/2003 | O'Neil et al. | |
| 2003/0175001 A1 | 9/2003 | Lawrence et al. | |
| 2003/0232957 A1 | 12/2003 | Silvi et al. | |
| 2004/0022495 A1 | 2/2004 | Shapiro et al. | |
| 2004/0107077 A1 | 6/2004 | Sinha et al. | |
| 2005/0133697 A1 | 6/2005 | Potyrailo et al. | |
| 2005/0136333 A1 | 6/2005 | Lawrence et al. | |
| 2005/0136357 A1 * | 6/2005 | Farid et al. | 430/270.11 |
| 2006/0135733 A1 | 6/2006 | Khouri et al. | |
| 2007/0114693 A1 | 5/2007 | Buckley et al. | |
| 2007/0208159 A1 | 9/2007 | McCloskey et al. | |
| 2007/0299186 A1 | 12/2007 | Chan et al. | |
| 2007/0299187 A1 | 12/2007 | Chan et al. | |
| 2007/0299188 A1 | 12/2007 | Chan et al. | |
| 2007/0299189 A1 | 12/2007 | Cao et al. | |
| 2008/0004391 A1 | 1/2008 | Chan et al. | |
| 2008/0012430 A1 | 1/2008 | Peters et al. | |
| 2008/0012707 A1 | 1/2008 | Peters et al. | |
| 2008/0015330 A1 | 1/2008 | Chan et al. | |
| 2008/0021175 A1 | 1/2008 | Chan et al. | |

| | | |
|---|---|---|
| 2008/0044639 A1 | 2/2008 | Chan et al. |
| 2008/0044682 A1 | 2/2008 | Chan et al. |
| 2008/0044683 A1 | 2/2008 | Chan et al. |
| 2008/0044684 A1 | 2/2008 | Chan et al. |
| 2008/0144145 A1* | 6/2008 | Boden et al. ............... 359/3 |
| 2008/0144146 A1* | 6/2008 | Boden et al. ............... 359/3 |
| 2008/0158627 A1 | 7/2008 | Lawrence et al. |
| 2008/0275185 A1 | 11/2008 | deKok et al. |
| 2008/0287640 A1 | 11/2008 | Belfadhel et al. |
| 2009/0036304 A1 | 2/2009 | Misner et al. |
| 2009/0197186 A1* | 8/2009 | Gu et al. ..................... 430/2 |
| 2009/0202919 A1* | 8/2009 | Waldman et al. .......... 430/2 |
| 2009/0214828 A1 | 8/2009 | Watkins et al. |
| 2009/0215620 A1 | 8/2009 | Cella et al. |
| 2009/0246441 A1 | 10/2009 | Chan et al. |
| 2009/0263612 A1 | 10/2009 | Gascoyne et al. |
| 2009/0284374 A1 | 11/2009 | Wisnudel et al. |
| 2009/0285075 A1 | 11/2009 | Wisnudel et al. |
| 2009/0285083 A1 | 11/2009 | Wisnudel et al. |
| 2010/0073167 A1 | 3/2010 | Krishnan et al. |
| 2010/0147762 A1 | 6/2010 | Zhang et al. |
| 2010/0158777 A1 | 6/2010 | Perry et al. |
| 2010/0216058 A1 | 8/2010 | McCloskey et al. |
| 2010/0216059 A1 | 8/2010 | McCloskey et al. |
| 2010/0234493 A1 | 9/2010 | Peters et al. |
| 2010/0302927 A1 | 12/2010 | Natarajan et al. |
| 2011/0051586 A1 | 3/2011 | Natarajan et al. |
| 2011/0053054 A1 | 3/2011 | Natarajan et al. |
| 2011/0053055 A1 | 3/2011 | Natarajan et al. |
| 2011/0080823 A1 | 4/2011 | Watkins et al. |
| 2011/0081602 A1 | 4/2011 | Natarajan et al. |

OTHER PUBLICATIONS

EP Search Report dated Apr. 16, 2012; Application No. 11178020.1-1214 / 2423917; pp. 1-6.

* cited by examiner

USE OF APPENDED DYES IN OPTICAL DATA STORAGE MEDIA

BACKGROUND

The present disclosure relates to compositions and optical data storage media as well as methods of using the optical data storage media.

Generally speaking, reverse saturable absorber (RSA) are compounds that have extremely low linear absorption at a given wavelength, and transmit nearly all of the light at this wavelength. However, when subjected to high intensity laser power at these given wavelengths, low level linear absorption can lead to a state where the molecule has a higher absorption cross section and becomes highly absorbing at that same wavelength; causing it to strongly absorb subsequent photons. For example, many RSAs experience photoexcitation when impinged upon by incident actinic radiation having a wavelength of 532 nm. Because this wavelength is within the green color portion of the visible spectrum, these RSA's may typically be referred to as "green" RSA's.

Recently, certain RSA's have found utility in the area of data storage systems. Optical data storage, wherein reading or writing of data is accomplished by shining light on, e.g., a disk, provides advantages over data recorded in media which must be read by other means, e.g., a magnetically sensitive head for reading magnetic media, or a needle for reading media recorded in vinyl. And, more data can be stored in smaller media optically than can be stored in vinyl media. Further, since contact is not required to read the data, optical media are not as vulnerable to deterioration over periods of repeated use as vinyl media.

Optical data storage media also offer multiple advantages when compared to magnetic storage media. For example, unlike the magnetic disk drives, optical data storage media are most commonly provided as removable media, readily suitable for archiving and backing up data, sharing of content between unconnected systems, and distribution of prerecorded content. Although removable magnetic media, e.g., magnetic tapes, are available, the life-time of information stored on such media is typically limited to 10-12 years, the media are generally rather expensive, and data access is slow. In contrast, optical data storage media can provide the flexibility of removable recordable and/or prerecorded medium, fast data access time, robust inexpensive manufacturing of the media and drives that are affordable enough for consumer computer and entertainment systems.

Nonetheless, conventional optical data storage media does have limitations. First, the storage density of optical media is limited by physical constraints on the minimum size of a recording bit. Another limitation of optical storage is that data is usually stored in one or two discrete layers, either on the surface or sandwiched within the media. Recording the information depth-wise can increase storage capacity, however, methods of doing so, i.e., bleaching and photoreactions, require a large amount of optical power to produce readable marks. As a result, the rate of recording using these conventional 3D recording methods is slow. Further, the media used in these methods typically exhibits a linear response to light energy, and as a result, may require some mechanism to eliminate the sensitivity of the medium to light after the data have been recorded to eliminate unintended erasure, data loss, etc.

Holographic storage is optical data storage in which the data is represented as holograms, which are images of three dimensional interference patterns created by the intersection of two beams of light in a photosensitive medium. More particularly, the superposition of a reference beam and a signal beam, containing digitally encoded data, forms a 3-D interference pattern within the volume of the medium resulting in a chemical reaction that changes or modulates the refractive index of the photosensitive medium. This modulation records both the intensity and phase information from the signal as the hologram. The hologram can later be retrieved by exposing the storage medium to the reference beam alone, which interacts with the stored holographic data to generate a reconstructed signal beam proportional to the initial signal beam used to store the holographic image.

Early attempts at holographic storage relied on a page-based approach, i.e., where the bits of digital information are encoded into volume holograms as two-dimensional arrays of logical zeros and ones that traversed a 'slice' of the necessarily linear media onto which the holograms were recorded. Because a relatively large volume of the media was utilized, the recording and read-out equipment required to utilize a page-based approach can be complex and expensive, and reading or writing within the media is very sensitive to fluctuations in temperature and vibrations, as well as to small variations in writing or reading wavelength or intensity.

As a result of these shortcomings, more recent research into holographic data storage has focused on a bit-wise approach, where each bit (or few bits) of information is represented by a hologram localized to a microscopic volume within a medium to create a region that reflects the readout light. Such localized volume holographic micro-reflectors may be arranged into multiple data layers throughout the volume of the medium. In such an arrangement, the readout and recording of data in the layers inevitably leads to exposure of the adjacent layers to the recording/readout radiation, and so, although linear materials have been shown to work for holographic data storage in single bit application, having a media that can support many layers of data without affecting other layers of data during the writing and reading steps would be more advantageous.

Materials capable of accommodating a bit-wise data storage approach are highly sought after as the equipment utilized to read and write to such material is either currently commercially available, or readily provided with modifications to readily commercially available reading and writing equipment. Further, holographic data storage by the bit-wise approach is more robust to temperature, wavelength, intensity variations, and vibration than holographic data stored using the page-based approach. In order to be optimally useful in the recordation of holograms, and in particular, micro-holograms, bit-wise data storage materials are typically non-linear and further, typically exhibit a refractive index change (Δn) of at least about 0.005 to about 0.05 in response to recording light. Ultimately, the magnitude of the refractive index modulations produced in the material by the recording light will define the diffraction efficiency for a given system configuration, which translates to the signal to noise ratio, bit error rate, and the achievable data density.

Thus, there remains a need for optical data storage media that can exhibit a non-linear (or "threshold") response to the recording light intensity and that is suitable for bit-wise holographic data storage. In particular, it would be advantageous for holograms stored in the media to be limited in depth so that increased capacity could be realized. It would be further desirable for such data storage media to be written in such a way that refractive index of the surrounding media is not significantly altered and that a substantial degradation of hologram efficiency at various depths is not seen.

BRIEF DESCRIPTION

In one embodiment, a composition is provided. The composition includes a polymer matrix and a reactant disposed within the polymer matrix and capable of undergoing a photochemical change upon excitation. The composition also includes a non-linear sensitizer chemically bonded to the polymer matrix. The non-linear sensitizer causes a refractive index change to the reactant upon exposure to one or more wavelengths of radiation.

In a further embodiment, an optical data storage medium is provided. The medium includes a polymer matrix and a reactant capable of undergoing a photochemical change upon excitation, thereby causing a refractive index change. The medium also includes a non-linear sensitizer capable of causing excitation of the reactant when the reactant is exposed to one or more wavelengths of radiation. The non-linear sensitizer is chemically bonded to the polymer matrix.

In an additional embodiment, an optical data storage medium is provided. The medium includes a polymer matrix having a plurality of microholograms formed at different lateral positions and depths. The medium also includes an energy transfer dye chemically bonded to polymers within the polymer matrix.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
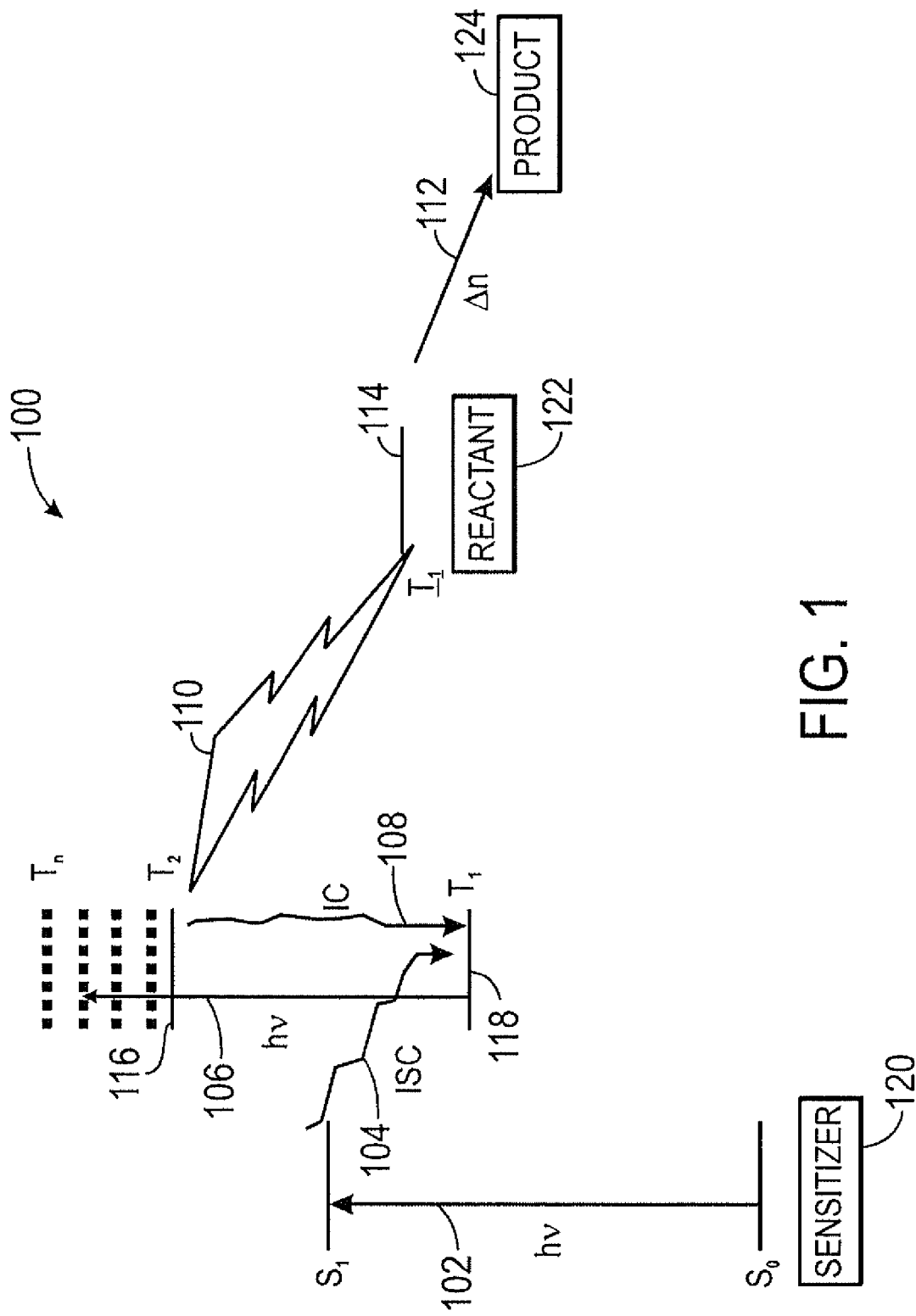
FIG. 1 is a schematic energy level diagram showing the upper triplet $T_n$ excited state absorption and resulting energy transfer for a sensitizer exhibiting reverse saturable absorption.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

As used herein, "diffraction efficiency" means a fraction of the beam power reflected by a hologram as measured at the hologram location with respect to the incident probe beam power, while "quantum efficiency" means a probability of an absorbed photon to result in a chemical change that produces a refractive index change. "Fluence" means the amount of optical beam energy that has traversed a unit area of the beam cross-section (measured, for example, in Joule/cm$^2$), while "intensity" means optical radiative flux density, e.g. amount of energy traversing a unit area of beam cross-section in unit time (measured in, for example, Watt/cm$^2$).

The present disclosure relates to compositions that include a reactant and a non-linear sensitizer. In certain embodiments the composition includes a reactant capable of undergoing a change upon triplet excitation ($T_n$; n>1) and a non-linear sensitizer, such as one or more subphthalocyanine (sub-PC) reverse saturable absorbers (RSAs). The non-linear sensitizers are capable of absorbing incident actinic radiation, e.g., in the form of one or more photons, and then transferring the energy to the reactant molecule to induce a molecular rearrangement of the reactant into a product. In one embodiment, the non-linear sensitizers used in the optical data storage media (such as media provided in the form of a disk) are capable of transferring energy from an upper triplet state ($T_n$, wherein n>1), which has a very short lifetime (nanoseconds to a few μ (micro) seconds), to the reactant.

In some embodiments, the present non-linear sensitizers may absorb two photons, typically, sequentially. Also, once the sensitizers described herein transfer the absorbed energy to the reactant, they return to their original state, and may repeat the process many times over. The sensitizers thus do not get substantially consumed over time, although their ability to absorb energy and release it to one or more reactants may degrade over time. This is in contrast to materials known conventionally as photosensitive materials, which can absorb energy (typically a single photon) and not transfer it to other molecules, but undergo conversion to a new structure, or react with another molecule to form a new compound in so doing.

In one embodiment, the non-linear sensitizers comprise subphthalo-cyanines which exhibit reverse saturable absorption (RSAs). Conventional phthalo-cyanine RSA's typically exhibit absorption spectra and non-linear optical responses more suited to use with "green" lasers, i.e., lasers utilizing radiation with a wavelength of about 532 nm. However, in present embodiments, certain of the subphthalocyanine RSAs discussed herein are suitable for use with 'blue' lasers, i.e., lasers utilizing radiation with a wavelength of about 405 nm, due to the substantial transparency of absorption at 405 nm when compared to 532 nm.

In one embodiment, the subphthalocyanine RSAs will be capable of entering into the upper triplet ($T_2$) state upon photoexcitation of the subphthalocyanine RSA with incident actinic radiation at a wavelength between about 380 nm and about 450 nm (such as about 405 nm) and transferring energy from this upper excited triplet state (Tn) to adjacent reactants. Subphthalocyanines are 14-π-electron aromatic molecules that possess a cone-like structure with a boron atom as the central metal, and an axial ligand The amount of non-linear sensitizer used in the composition can depend on its optical density at the wavelength of incident actinic radiation. Solubility of the sensitizer may also be a factor. Generally speaking, the sensitizer may be used in amounts of from about 0.002 weight % to about 5 weight % based upon the total weight of the composition.

The reactant(s) utilized in the present composition are capable of undergoing a change upon triplet excitation. Referring to FIG. 1, the reactants 122 used in the present optical data storage media have a triplet energy denoted by arrow 114 below that of the $T_2$ state of the sensitizer 120 denoted by arrow 116, but above that of the $T_1$ state of the sensitizer 120, shown at arrow 118. The reactants 122 are also capable of receiving energy from an upper triplet state ($T_2$ or higher) of the sensitizer 120, and undergoing a change to form a product 124.

As used herein, the term "change" is meant to include any indirect photochemical reaction of the reactant, e.g., photo-dimerization or isomerization. Photodimerization is a bimolecular photochemical process involving an electronically excited unsaturated molecule that undergoes addition with an unexcited molecule of a structurally similar and/or identical species (e.g. two olefins combining to form a cyclobutane ring structure). The covalent bonding that occurs in this reaction produces a new moiety, which can be generally classified as a photoproduct. When the word "indirect" is used in conjunction with terms such as photodimerization or photochemical reaction or photoreaction, it means that the reactant did not receive the energy directly from absorption of a photon, but rather from another molecule (such as, e.g., a sensitizer or mediator) that first absorbed the photon and then transferred a portion of that energy to the reactant that subsequently underwent dimerization.

Examples of reactants suitable for use in some embodiments of the described composition include, but are not limited to, (i) those that can undergo dimerization so that less volume change is required to go from reactant to product, e.g., reactants that undergo dimerization processes not by direct photoexcitation of the reactant but by indirect "non-radiative energy transfer" (in the present case, triplet-to-triplet energy transfer) pathway from the photoexcited sensitizer to the reactant; (ii) those for which a non-linear sensitizer receives energy from a two-photon process and delivers that energy to one reactant that subsequently condenses with a second reactant to provide a product; (iii) those that, when derivatized on a polymer backbone can provide a very large refractive index change, which corresponds to the available capacity of the material, e.g., a $\Delta n_{max}$ of at least about 0.08 can be achieved if >85% of the reactants are converted to product; and (iv) those that, when derivatized on a polymer backbone, are capable of undergoing both inter- and intramolecular condensation reactions, thereby accelerating the consumption thereof, and providing desired refractive index ($\Delta n$) changes with incident fluence of less than 10 J/cm$^2$ as a result of higher quantum efficiency of the sensitized photo-reaction, which in turn may also provide greater diffraction efficiencies and shorter recording times within, e.g., a data storage medium incorporating the composition.

As those of ordinary skill in the art appreciate, holographic data storage is based on the ability to create a refractive index change (dn) of the individual fringes within the hologram, compared to the surrounding material, on the order of 0.005 to 0.05. However, measuring the refractive index of individual fringes is not possible. Refractive index (RI) measurements can be done on bulk materials using spin coated samples in combination with an instrument knows as an ellipsometer. Thus, the reactive materials used in these applications have first been tested to determine the net available dn the material is capable of by measuring the RI of the unreacted sample and then converting over 85% of the material to the reacted form and remeasuring the RI to determine the dn. In holographic data storage, one relevant aspect related to the hologram is having a sufficient amount of light reflected back (diffracted) to the detector to represent a bit of information. This can be determined by measuring the diffraction efficiency of the material. Experimentally, it is easiest to use relatively low numerical aperture (NA) lenses and write relatively large holograms to record relatively large diffraction efficiencies. For example, based on the predictions of the coupled wave theory, for a given magnitude of the refractive index modulation, the DE is approximately proportional to the square of the hologram depth. The hologram depth is approximately inversely proportional to NA$^2$, which makes overall dependence of DE~1/NA$^4$. Thus, the DE is a function, among other things, of the response of the reactive material, the NA of the lens used, and the fluence used to record the hologram. Since those parameters are often different for experimentalist working on holographic data storage, correlating those measurements back to an approximate do may be a suitable method of comparing materials/systems.

Any reactant(s) having a triplet energy state between the $T_1$ and $T_2$ states of the sensitizer can be utilized, and, selection of an appropriate reactant can thus depend upon the selection of the desired sensitizer. Suitable reactants include, but are not limited to, stilbenes. Specific examples of stilbenes expected to be useful in the optical storage media (e.g., optical storage disks) disclosed herein include, but are not limited to trans-stilbene, meta- (or) para halogen (F, Cl, Br, or I) substituted stilbene, meta- (or) para trans-methylstilbene, trans-[meta- (or) para]nitrostilbene, trans-[meta- (or) para]cyanostilbene, trans-[meta- (or) para]-methoxystilbene, trans-[3,3'] or [4,4'], or [2,4] or [3,4]dimethoxy, difluoro, dibromo, dichloro, diiodo, substituted trans-stilbenes, trans-2,4,6-trimethylstilbene, trans-2,2',4,4',6,6'-hexamethylstilbene, or combinations of these.

Even more specifically, suitable reactants include (E)-1-methoxy-4-styrylbenzene, (E)-1-fluoro-4-styrylbenzene, (E)-1-chloro-4-styrylbenzene, (E)-1-bromo-4-styrylbenzene, (E)-1-iodo-4-styrylbenzene, (E)-1-methoxy-3-styrylbenzene, (E)-1-fluoro-3-styrylbenzene, (E)-1-chloro-3-styrylbenzene, (E)-1-bromo-3-styrylbenzene, (E)-1-iodo-3-styrylbenzene, (E)-1-cyano-4-styrylbenzene, or combinations thereof.

Yet other suitable reactants include (E)-1,2-bis(4-methoxyphenyl)ethene, (E)-1,2-bis(4-fluorophenyl)ethene, (E)-1,2-bis(4-chlorophenyl)ethene, (E)-1,2-bis(4-bromophenyl)ethene, (E)-1,2-bis(4-iodophenyl)ethene, (E)-1,2-bis(3-methoxyphenyl)ethene, (E)-1,2-bis(3-fluorophenyl)ethene, (E)-1,2-bis(3-chlorophenyl)ethene, (E)-1,2-bis (3-bromophenyl)ethene, (E)-1,2-bis(3-iodophenyl)ethene, or combinations of these.

Still other suitable reactants include (E)-1-methoxy-2-(4-methoxystyryl)benzene, (E)-1-fluoro-2-(4-fluorostyryl)benzene, (E)-1-chloro-2-(4-chlorostyryl)benzene, (E)-1-bromo-2-(4-bromo styryl)benzene, (E)-1-iodo-2-(4-iodostyryl)benzene, (E)-1-iodo-2-(4-cyanostyryl)benzene, (E)-1-methoxy-3-(4-methoxystyryl)benzene, (E)-1-fluoro-3-(4-fluorostyryl)benzene, (E)-1-chloro-3-(4-chlorostyryl)benzene, (E)-1-bromo-3-(4-bromostyryl)benzene, (E)-1-iodo-3-(4-iodostyryl)benzene, (E)-1-iodo-3-(4-cyanostyryl)benzene, (E)-1-methoxy-2-(3-methoxystyryl)benzene, (E)-1-fluoro-2-(3-fluorostyryl)benzene, (E)-1-chloro-2-(3-chlorostyryl)benzene, (E)-1-bromo-2-(3-bromostyryl)benzene, (E)-1-iodo-2-(3-iodostyryl)benzene, (E)-1-iodo-2-(3-cyanostyryl)benzene, or combinations thereof.

In other embodiments, the reactant(s) may comprise one or more cinnamate materials, cinnamate derivatives, and cinnamamide derivatives such as those recently discovered and disclosed in U.S. patent application Ser. No. 12/550,521, entitled "Optical Data Storage Media and Methods of Using the Same", filed on Aug. 31, 2009 and incorporated herein by reference in its entirety for any and all purposes, so long as not directly contradictory with the teachings herein. In some embodiments, cinnamate materials that are capable of undergoing [2+2] indirect photodimerization and indirect photopolymerization may be used, due to their transparency (negligible UV absorption) at 405 nm in order to keep the linear bleaching of the cinnamate to a minimum and facilitate only the triplet-triplet energy transfer from the excited sensitizer. In some embodiments, the cinnamate materials may include polyvinylcinnamates (PVCm) with cinnamate content of the polyvinyl backbone varying between about 54 wt % to about 75 wt % based upon the total weight of the polyvinylcinnamate.

Examples of polyvinylcinnamates and cinnamamide analogs include, but are not limited to polyvinylcinnamate (PVCm), polyvinyl 4-chlorocinnamate (PVClCm), polyvinyl 4-methoxycinnamate (PVMeOCm), (2E,2'E)-((1S,2S)-cyclohexane-1,2-diyl)bis(3-phenylacrylate), (2E,2'E)-(1S,2S)-cyclohexane-1,2-diyl)bis(4-chlorophenyl acrylate), (2E,2'E)-(1S,2S)-cyclohexane-1,2-diyl)bis(4-methoxyphenyl) acrylate). (2E,2'E)-N,N'-((1S,2S)-cyclohexane-1,2-diyl)bis(3-phenyl)acrylamide (2E,2'E)-N,N'-((1S,2S)-cyclohexane-1,2-diyl)bis(3-(4-chlorophenyl)acrylamide), (2E,2'E)-N,N'-((1S,2S)-cyclohexane-1,2-diaryl)bis(3-(4-methoxyphenyl) acrylamide. These are shown below:

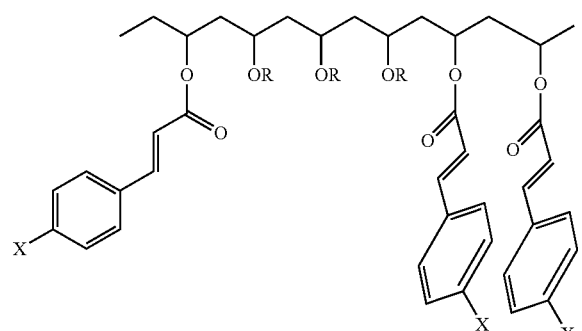

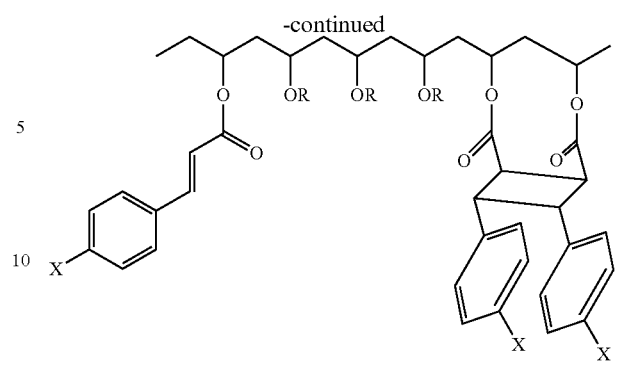

Where R═H or Cinnamate
X═H (Polyvinylcinnamate (PVCm), OMe (Polyvinyl 4-methoxycinnamate (PVMeOCm), or Cl (Polyvinyl 4-chlorocinnamate (PVClCm)

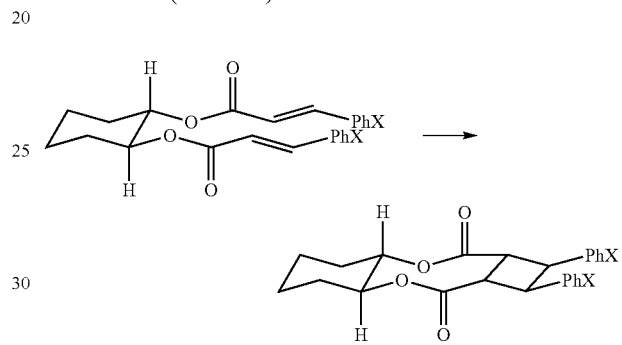

Where
X=(para)-H: (2E,2'E)-((1S,2S)-cyclohexane-1,2-diyl)-bis(3-phenylacrylate) or
X=(para)-Cl: (2E,2'E)-((1S,2S)-cyclohexane-1,2-diyl)bis(3-(4-chlorophenyl)acrylate) or
X=(para)-MeO: (2E,2'E)-((1S,2S)-cyclohexane-1,2-diyl)bis (3-(4-methoxyphenyl)acrylate)

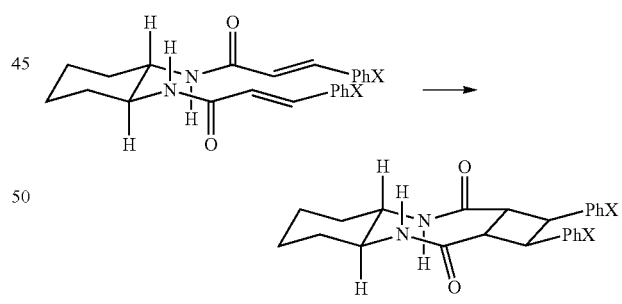

Where
X=(para)-H: (2E,2'E)-N,N'-((1S,2S)-cyclohexane-1,2-diyl) bis(3-phenyl)acryl amide) or
X=(para)-Cl: (2E,2'E)-N,N'-((1S,2S)-cyclohexane-1,2-diyl) bis(3-(4-chlorophenyl)acrylamide) or
X=(para)-MeO: (2E,2'E)-N,N'-((1S,2S)-cyclohexane-1,2-diyl)bis(3-(4-methoxyphenyl)acrylamide).

The reactant may be present in relatively high concentrations to promote more efficient triplet energy transfer. For example, the reactant may be present in the composition in amounts of from about 2 weight % to about 80 weight %, based upon the total weight of the composition.

Optionally, the composition may further comprise a mediator to assist in upper triplet energy transfer from the sensitizer to the reactant. The triplet state ($T_{1m}$) of the mediator will desirably be (a) below the triplet state ($T_n$; n>1) of the sensitizer but above the $T_1$ of the sensitizer and (b) above the triplet state ($T_{1r}$) of the reactant, or ideally between about 50 kcal/mol and 90 kcal/mol.

Examples of suitable mediators include, but are not limited to, acetophenone ($T_1$≈78 kcal/mol), dimethylphthalate ($T_1$≈73 kcal/mol), propiophenone ($T_1$≈72.8 kcal/mol), isobutyrophenone ($T_1$≈71.9 kcal/mol), cyclopropylphenylketone ($T_1$≈71.7 kcal/mol), deoxybenzoin ($T_1$≈71.7 kcal/mol), carbazole ($T_1$≈69.76 kcal/mol), diphenyleneoxide ($T_1$≈69.76 kcal/mol), dibenzothiophene ($T_1$≈69.5 kcal/mol), 2-dibenzoylbenzene ($T_1$≈68.57 kcal/mol), benzophenone ($T_1$≈68 kcal/mol), polyvinylbenzophenone ($T_1$≈68 kcal/mol), 1,4-diacetylbenzene ($T_1$≈67.38 kcal/mol), 9H-fluorene ($T_1$≈67 kcal/mol), triacetylbenzene ($T_1$≈65.7 kcal/mol), thioxanthone ($T_1$≈65.2 kcal/mol), biphenyl ($T_1$≈65 kcal/mol), phenanthrene ($T_1$≈62 kcal/mol), phenanthrene ($T_1$≈61.9 kcal/mol), flavone ($T_1$≈61.9 kcal/mol), 1-napthonirile ($T_1$≈57.2 kcal/mol), poly (β-naphthoylstyrene) ($T_1$≈55.7 kcal/mol), Fluorenone ($T_1$≈55 kcal/mol), and combinations of these The amount of mediator used, if any, should not be so much as to cause self-quenching, i.e., when two triplets of the mediator meet each other to generate a singlet state and a ground state of the mediator. Suitable amounts of any mediator may also depend on the particular sensitizer. Bearing such considerations in mind, useful concentrations of the mediator can range from about 1 weight % to about 20 weight % based upon the total weight of the composition.

The compositions provided may be utilized in any application in which their properties may provide benefit. Examples of these include, but are not limited to, optical waveguides, gradient index lenses, optical data storage media (e.g., optical storage disks) and in digital holographic imaging.

Optical waveguides are used as components in integrated optical circuits and can be made in various ways. One way is to use a laser to pattern a photosensitive material creating a "core" of one refractive index material surrounded by a "cladding" material of a different refractive index that serves to guide the light. Generally, these photosensitive materials are linearly responsive; requiring the wavelength of the patterning laser and the absorption of material that undergoes refractive index change to both be at wavelengths well away from the wavelengths of light that will actually travel within the waveguide. This is because if the waveguided beam is the same or nearly the same as the light traveling in the core, then it will begin to bleach the cladding material and broaden the waveguide; making it degrade and become unusable. However, with these materials, the medium will only change at the highest intensity area of the beam during patterning, and together with the threshold effect, could produce sharper contrast between the core and cladding regions. Also, light of a similar wavelength at lower intensity could travel down the core and would not degrade the cladding material. Optical waveguides could thus be improved via incorporation of the compositions described herein.

Gradient-index (GRIN) lenses could also be fashioned from the compositions described herein. A GRIN lens is a lens whose material refractive index varies continuously as a function of spatial coordinates in the medium. With the present compositions, a composition could be converted into a GRIN lens by patterning with a laser operating at high power. Alternatively, a blank lens with a composition could be modified into a GRIN lens in a similar manner. The advantages are that the lens could be used with low power light beams at various wavelengths without the danger of bleaching away the GRIN and destroying the lens.

Digital holographic imaging is a way to create 3D images useful for visualizing without the aid of special glasses (autostereoscopic). These are useful for producing interactive 3D displays for government and commercial uses such as cities with skyscrapers that can be viewed from various angles. Again, use of the compositions described, with threshold characteristics, allows the proper patterning without the problem of bleaching in ambient light.

There is also provided herein an optical data storage medium that, in addition to the non-linear sensitizer, reactant, and optional mediator, further comprises a polymer matrix. The optical data storage medium may exhibit a non-linear response to actinic radiation, i.e., experiences no substantial change in refractive index for incident laser light below a threshold, and significant changes in refractive index above the threshold. In one embodiment, recording into such a medium is possible with light having a power, or intensity, exceeding a threshold value. However, the recorded data can be repeatedly and substantially non-destructively read with light having an intensity below the threshold. Microholograms recorded in the present optical data storage media are expected to be smaller in size than the beam used to record them. Finally, the media comprises a sensitizer capable of absorbing actinic radiation at or about 380 nm to at or about 450 nm (such as at about 405 nm) to cause upper triplet-to-triplet energy transfer to the reactant, so that storage capacity of the media is optimized, while the media is yet compatible with current conventional storage formats, e.g., Blu-ray.

The optical data storage media comprises a non-linear sensitizer and a reactant dispersed within a polymer matrix. The non-linear sensitizers are capable of absorbing incident actinic radiation, e.g., in the form of one or more photons, and then transferring the energy to the reactant molecule to induce a molecular rearrangement of the reactant into a product that, in turn, gives rise to modulations in the refractive index of the medium. This modulation records both the intensity and phase information from the incident actinic radiation as the hologram. The advantages of the use of non-linear (e.g., "threshold-based") sensitizers as opposed to linear sensitizers can be further understood with references to FIGS. 4, 5, and 6.

Figure 2:
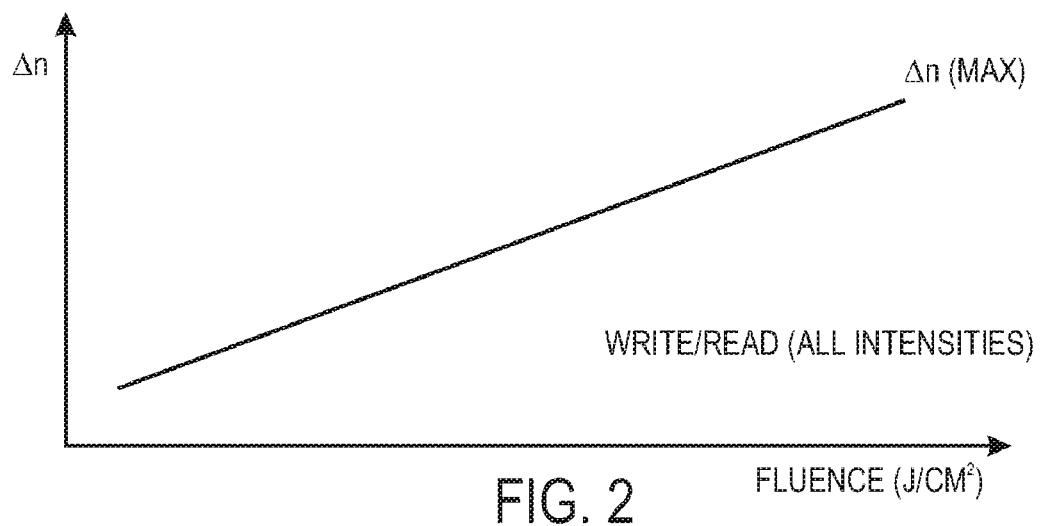
FIG. 2 is a graphical depiction of the response of a linear sensitizer to actinic radiation.
Figure 3:
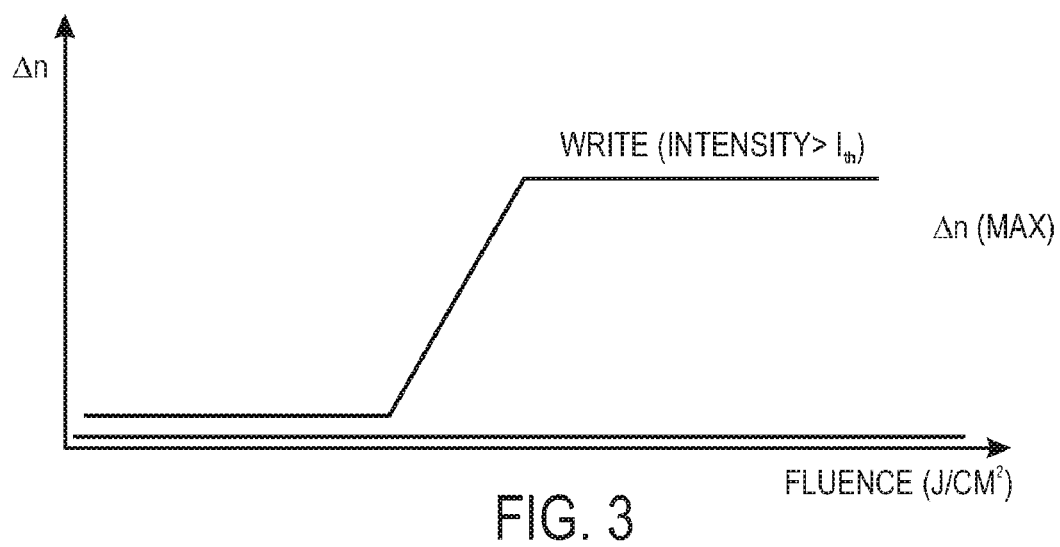
FIG. 3 is a graphical depiction of the response of a threshold sensitizer to actinic radiation.

More specifically, FIG. 2 shows the response of a linear photosensitive material to incident actinic radiation, while FIG. 3 shows the response of a threshold material to incident actinic radiation. As is shown in FIG. 2, linear photosensitive materials will cause a reaction at any power density (intensity) of recording light and the amount of the refractive index change (Δn) achieved will be the same for the same radiative energy (fluence) received by the material. In contrast, threshold materials will only cause a reaction at and over a certain light intensity of recording light.

Figure 4:
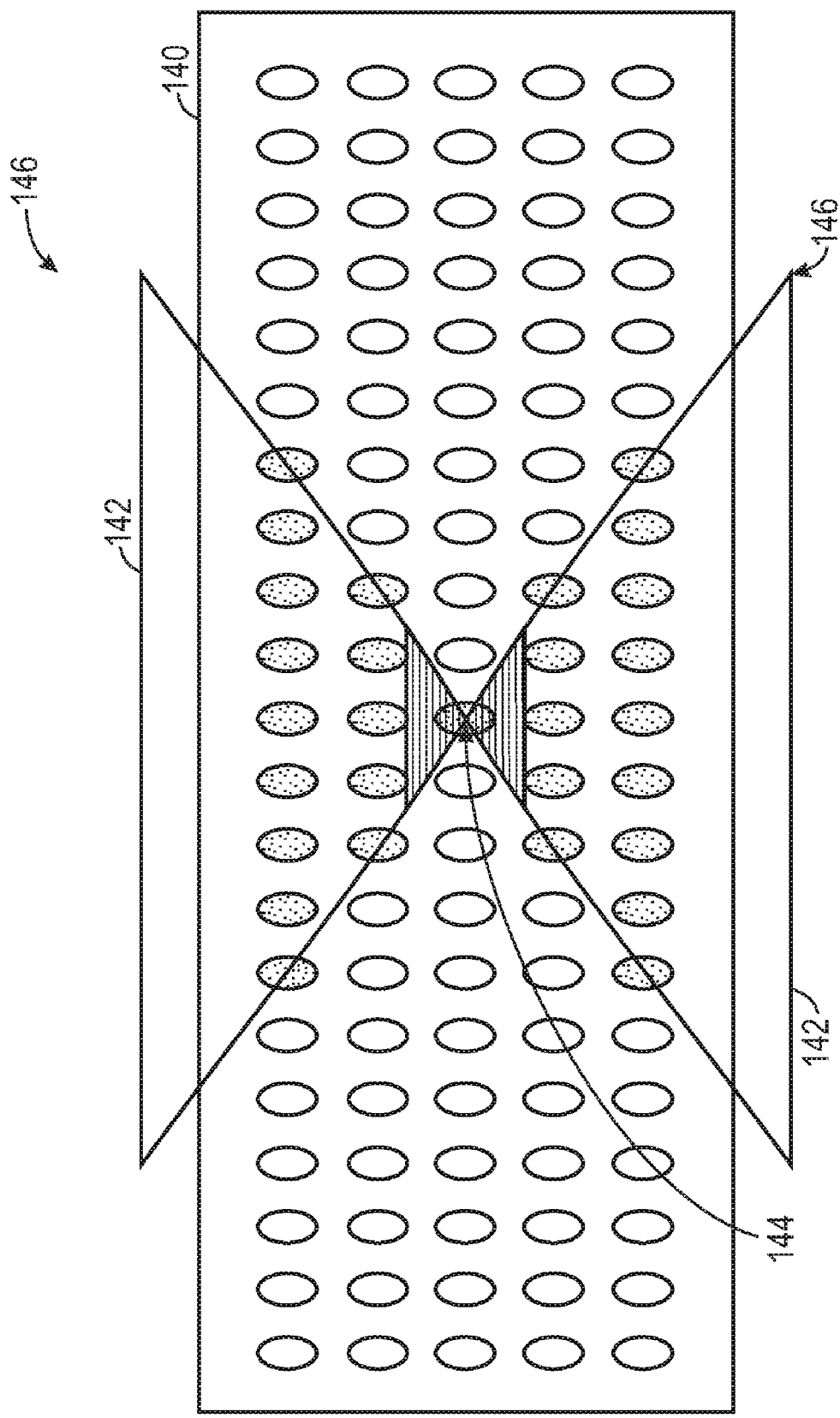
FIG. 4 is a cross-sectional view of an optical storage media, showing the area of impact of actinic radiation if the media comprises a linear sensitizer and the area of impact of actinic radiation if the media comprises a threshold sensitizer.

As a result, and as is shown in FIG. 4, in an optical data storage media 140 formed from linear photosensitive materials, consumption of dynamic range will occur in non-addressed volumes, substantially everywhere actinic radiation (such as provided by lasers 146) passes through, shown as sections 142. In contrast, if the optical data storage media 140 is formed using threshold materials, consumption of dynamic range in non-addressed volumes is reduced or eliminated and consumption will occur substantially only in the target volume, i.e., at the focal point 144 of the actinic radiation. The use of threshold materials in the present optical data storage medium thus facilitates recording into a layer of bit-wise data buried in the bulk of the medium without disruption of adjacent layers of previously recorded data or vacant space available for subsequent recording. Also, as the light intensity in a tightly focused laser beam varies through the depth of the focal spot and is usually at its maximum at the beam waist (narrowest cross section), the threshold response of the medium will restrict material conversion to the vicinity of the beam waist. This may lead to a reduction in microhologram size within each layer, thus facilitating an increase in layer data storage capacity of the present media, so that the overall data storage capacity of the media may also be increased. The optical data storage media formed using threshold materials may also be substantially stable in ambient light, so that exposure to such ambient light does not result in substantial deterioration or damage to the media.

As mentioned above, the non-linear sensitizers used in the present compositions and optical data storage media are capable of transferring energy from an upper triplet state ($T_n$, wherein n>1), which has a very short lifetime (nanoseconds to a few μ (micro) seconds), to the reactant. The ability to transfer energy from the $T_n$ state provides the optical data storage media provided herein with its non-linear, threshold properties. That is, $T_n$ excited state absorption is only appreciable when the sensitizer is excited by high-intensity light, e.g., light having an intensity at least 2 orders of magnitude or more greater than ambient light, and negligibly small when subjected to low-energy radiation. This allows for the present optical data storage media, comprising the non-linear sensitizers, to remain substantially transparent and inert to low intensity radiation, e.g., reading or ambient light, and to only change its properties (absorbance and thus, refractive index) in response to high energy recording light at or near the focal points. As a result, the present optical data storage media exhibits the threshold behavior desired and/or necessary for the bit-wise recordation of microholographic data.

With the foregoing in mind and returning to FIG. 1, a schematic energy level diagram is depicted showing the upper triplet $T_n$ excited state absorption and resulting energy transfer for a sensitizer exhibiting reverse saturable absorption. As shown in energy level diagram 100, arrow 102 illustrates the ground state absorption cross section of a photon as it transitions from the singlet ground state $S_0$ to a first excited state $S_1$. The intersystem-crossing rate, represented by arrow 104, signifies the transfer of energy that occurs when the sensitizer 120 moves from an excited singlet state $S_1$ to a corresponding triplet state $T_1$. Arrow 106 indicates the excited triplet state absorption cross section. Once the upper level triplet state $T_n$ is achieved by subsequent linear absorption, two upper excited decay processes are possible. One possible decay process, denoted by arrow 108 in FIG. 1, is the non-radiative relaxation by internal conversion (IC) to the lower lying $T_1$ state. The other possible decay process is denoted by arrow 110 in FIG. 1, and involves the release of energy from the sensitizer 120 and the transfer of this energy to the reactant 122 via triplet-triplet energy transfer. The reactant 122 then undergoes a change denoted by arrow 112 to form the holographic grating and record the data there.

The amount of non-linear sensitizer used in the optical data storage media can depend on its optical density at the wavelength of light used to record the hologram. Solubility of the sensitizer may also be a factor. Generally speaking, the sensitizer may be used in an amount of from about 0.002 weight % to about 5 weight % based upon the total weight of the optical data storage media.

In some embodiments, the optical data storage media is expected to exhibit refractive index changes (Δn) suitable for the recordation of microholograms at high data densities, e.g., refractive index changes of at least about 0.005, or at least about 0.05, or even greater. Because of the refractive index change/diffraction efficiencies achievable by the present optical data storage media, the media may be capable of storing about 1 TB of information on a disk comparable in size to a single CD or single DVD.

Also, the use of the reactants disclosed herein may provide a significant decrease in birefringence as compared to conventional reactants. Further, the optical recording media described provides the ability to rapidly create high-resolution micro-holograms with reduced or minimal heat formation and signal leakage to neighboring locations that can result in smearing of the captured holographic pattern.

In certain embodiments, the reactant may be present in relatively high concentrations both to yield large changes in optical properties within the polymer matrix and to promote more efficient triplet energy transfer. For example, the reactant may be present in the optical data storage media in amounts of from about 2 wt % to about 80 wt %, based upon the total weight of the optical data storage media.

The reactant(s) may provide the possibility of a higher loading in the optical data storage media when derivatized on a polymer backbone than conventional reactants. That is, whereas loading of conventional reactants when derivatized on a polymer backbone may be limited to no more than about 30 wt %, the novel reactants described here can be loaded onto polymer backbones at much greater loadings, i.e., even up to about 90 wt %, based upon the total weight of the optical data storage media.

The reactant may be covalently attached, or otherwise associated with, the polymer matrix of the optical data storage media. For example, polymers functionalized with cinnamates may be utilized as the polymer matrix, and e.g., polyvinyl cinnamates are readily commercially available. In this case, the optical data storage media may comprise higher loading amounts of the reactants, e.g., up to about 90 wt %, based upon the total weight of the optical data storage media.

Further, if utilized, any desired mediator may be covalently attached to, or otherwise associated with, the polymer matrix. Incorporating the mediator into the polymer matrix in this way can allow for higher concentrations of the mediator to be utilized, which, in turn, can increase recording efficiency of the data storage media.

The desired sensitizer and reactant, and optional photostabilizer and mediator, may be substantially uniformly dispersed through a polymer matrix, or may be dispersed in any fashion so that bit-wise data recordation is facilitated within the optical data storage medium. The polymer matrix may be a linear, branched or cross-linked polymer or co-polymer or other suitable medium. Any polymer may be used so long as the sensitizer and reactant can be substantially uniformly dispersed therein. Further, any polymer utilized typically will not substantially interfere with the upper triplet energy transfer process. The polymer matrix may be provided as a polymer that is optically transparent, or at least has a high transparency at the wavelength contemplated for recording and reading the optical data storage medium.

Examples of suitable polymers for use in the polymer matrix include, but are not limited to, poly(alkyl methacrylates), such as poly(methyl methacrylate) (PMMA), polyvinyl alcohols, poly(alkyl acrylates), polystyrenes, polycarbonates, poly acrylates, poly(vinylidene chloride), poly(vinyl acetate), and the like.

The polymer matrix may also contain a plasticizer, such as dibutyl phthalate, dibutyl sebacate or di(2-ethylhexyl) adipate. Plasticizers can enhance recording efficiencies by facilitating molecular motion. Typical plasticizer levels can range from about 1 weight % to about 20 weight %, based upon the total weight of the storage media, or from about 2 wt % to about 10 wt %.

With the foregoing discussion in mind, the use of phenoxy subphthalocyanines (sub-PC) as energy transfer agents for cinnamate photodimerization in polyvinyl cinnamate is described herein as one example of an implementation. In certain implementations subphthalocyanines (or other suitable energy transfer agents) which are doped into the polymer (or other suitable) substrate (such as a PVC matrix) tend to aggregate within the polymer substrate, leading to non-uniformities (e.g., self-aggregation and so forth). For example, the tendency for doped sub-PC's to aggregate in polyvinyl cinnamate may be due to their low solubility in such a matrix. Such non-uniformities may compromise the efficacy of energy transfer, such as due to self-quenching. For example, to achieve diffraction efficiency (DE)$\geq$1% in an RSA dye doped material, high recording fluences (e.g., >340 J/cm$^2$) may be employed. Further, doping approaches may be limited to loading levels of the energy transfer agent (e.g., dye) relative to the matrix that are <3 wt %.

With this tendency in mind, one presently contemplated approach is to design and/or synthesize phenoxy sub-PC's that can be appended or derivatized onto the materials forming the substrate directly to inhibit or prevent dye aggregation and to provide a generally homogenous distribution of the dye material and the index change material in the substrate. As discussed herein, approaches using such appended dyes may allow an increase in the loading levels relative to the polymer matrix (such as up to 3 wt %, 4 wt %, 5 wt %, 6 wt %, 7 wt %, or 10 wt %) so as to obtain sufficient sensitivity for microhologram recording. For example, in one implementation using appended dyes, a DE$\geq$1% may be obtained with lower recording fluences (e.g., fluences <340 J/cm$^2$, <300 J/cm$^2$, <250 J/cm$^2$, <200 J/cm$^2$, <150 J/cm$^2$, <100 J/cm$^2$, and <70 J/cm$^2$).

Figure 5:
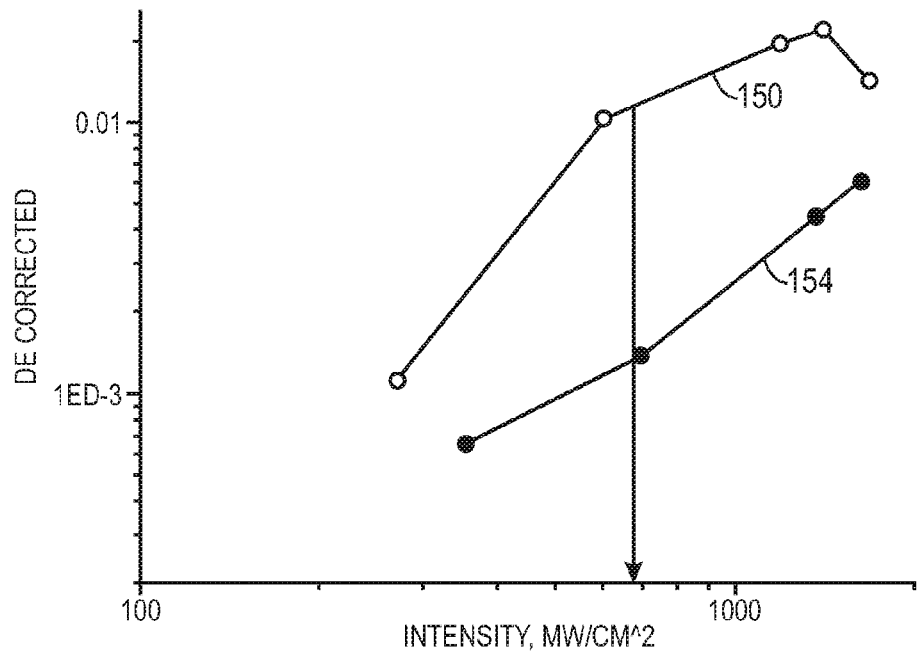
FIG. 5 is a graphical depiction of diffraction efficiency as a function of laser intensity for doped and appended dye embodiments, in accordance with aspects of the present disclosure.
Figure 6:
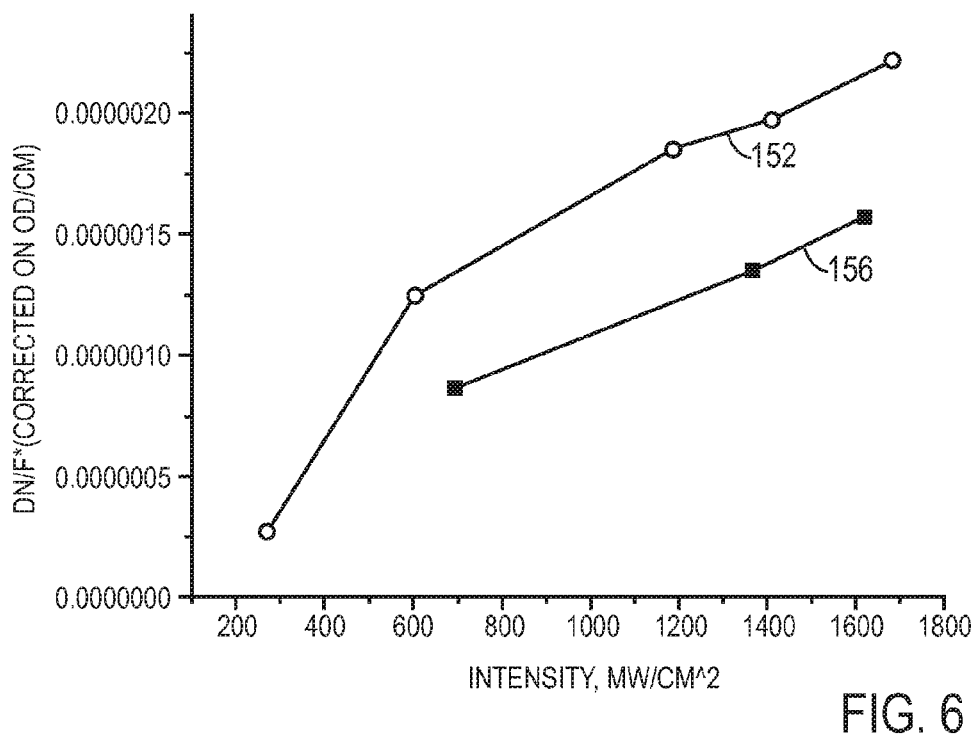
FIG. 6 is a graphical depiction of sensitivity as a function of laser intensity for doped and appended dye embodiments, in accordance with aspects of the present disclosure.

For example, turning to FIGS. 5 and 6, a graphical depiction is provided of the difference in diffraction efficiency (FIG. 5) and sensitivity (FIG. 6) that may be obtained using dye materials (lines 150 and 154) appended to the polymer backbone as opposed to dye materials that are doped (lines 152 and 156). As depicted in FIG. 5, greater diffraction efficiency is obtained over the full measured range of laser intensity. Likewise, as depicted in FIG. 6, greater sensitivity is obtained over the full measured range of laser intensity.

In the context of a PVC matrix implementation, a variety of approaches may be employed to append or derivatize (i.e., chemically attach or bond) an index change material (i.e., reactant) as well as a dye composition to the polymer backbone. For example, appending or derivatizing such molecules (e.g., the dye material) to the polymer backbone may be accomplished by forming covalent, ionic, or other chemical bonds between the dye and backbone molecules. As noted above, such implementations may be in contrast to other approaches in which the threshold dye materials are separately doped in the polymer matrix to induce a 2+2 photodimerization of a reactant (i.e., index change material) to a product to give rise to local changes in absorption and index of refraction.

In one implementation, direct functionalization of the polyvinyl alcohol backbone prior to incorporation of the cinnamate moiety may be employed. In such an implementation, consideration may be given to the selection of the dye due to low thermal stability and low hydrolytic stability of certain dyes in the presence of acid and basic conditions. Incorporating the dye after formation of the cinnamate may be possible. However, the baseline resin color (low absorbance at 405 nm) is a characteristic of interest for this resin, and additional chemistries may generate additional color. Therefore, it may instead be of interest to perform a dye attachment procedure that is compatible with the actual poly vinyl cinnamate preparation.

Figure 7:
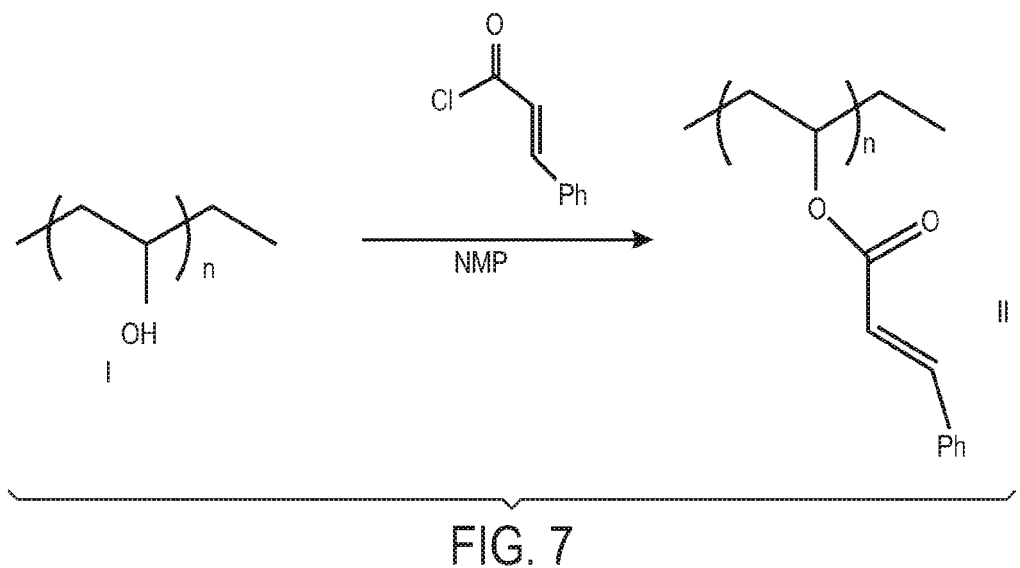
FIG. 7 depicts a chemical reaction that may occur in preparation of a suitable dye, in accordance with aspects of the present disclosure.

For example, referring now to FIG. 7, in one implementation the polyvinyl cinnamate preparation involves initial dissolution of polyvinyl alcohol (I), typically 88 to 100% hydrolysed, in hot n-methylpyrrolidinone (NMP). The PVA was functionalized with cinnamate by addition of cinnamoyl chloride (II) to the NMP solution at 50° C. The acid chloride was added as a solid in portion over 4 hours to the reaction mixture. The resulting PVC was isolated by precipitation into methanol; typically the cinnamate functionalization was greater than 75 mole %

Figure 8:
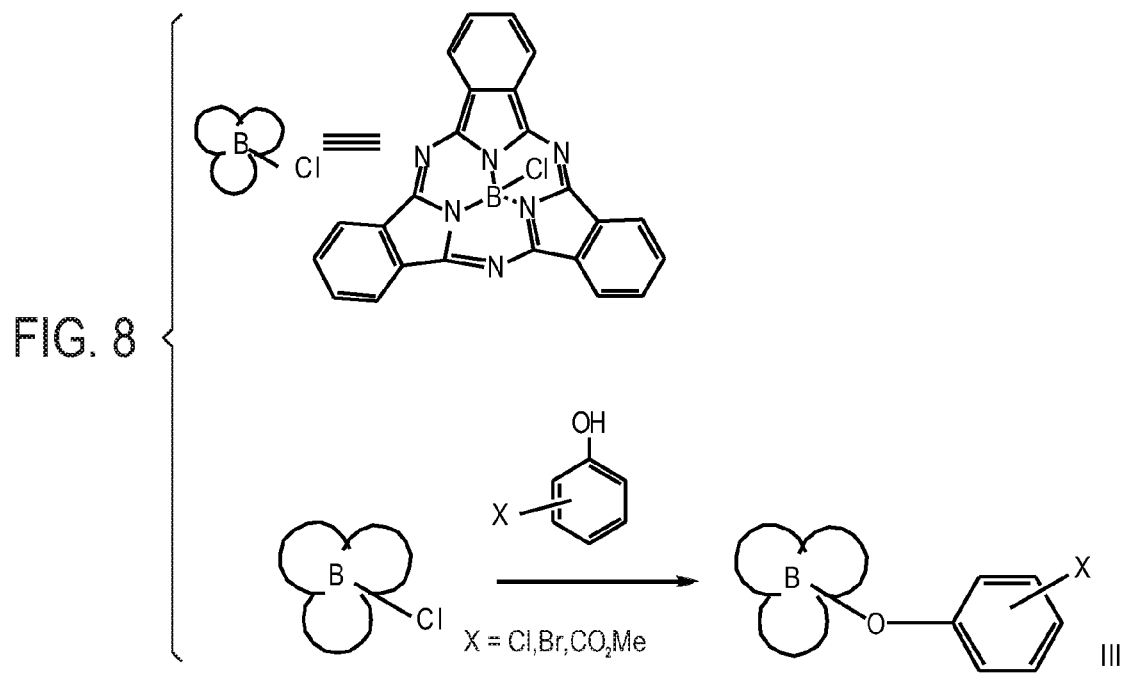
FIG. 8 depicts a chemical reaction that may occur in preparation of phenoxy subphthalocyanine, in accordance with aspects of the present disclosure.

Referring now to FIG. 8, it was hypothesized that synthesizing a subPC dye with an acid appendage that could be readily converted to an acid chloride would provide an efficient convergent synthesis of PVC with the dye incorporated into the backbone. One method to make phenoxy subPC's (III) is to react a phenol with the subPC chloride in refluxing toluene. Therefore reacting a phenol with an acid moiety may provide a direct route to the desired acid.

Figure 9:
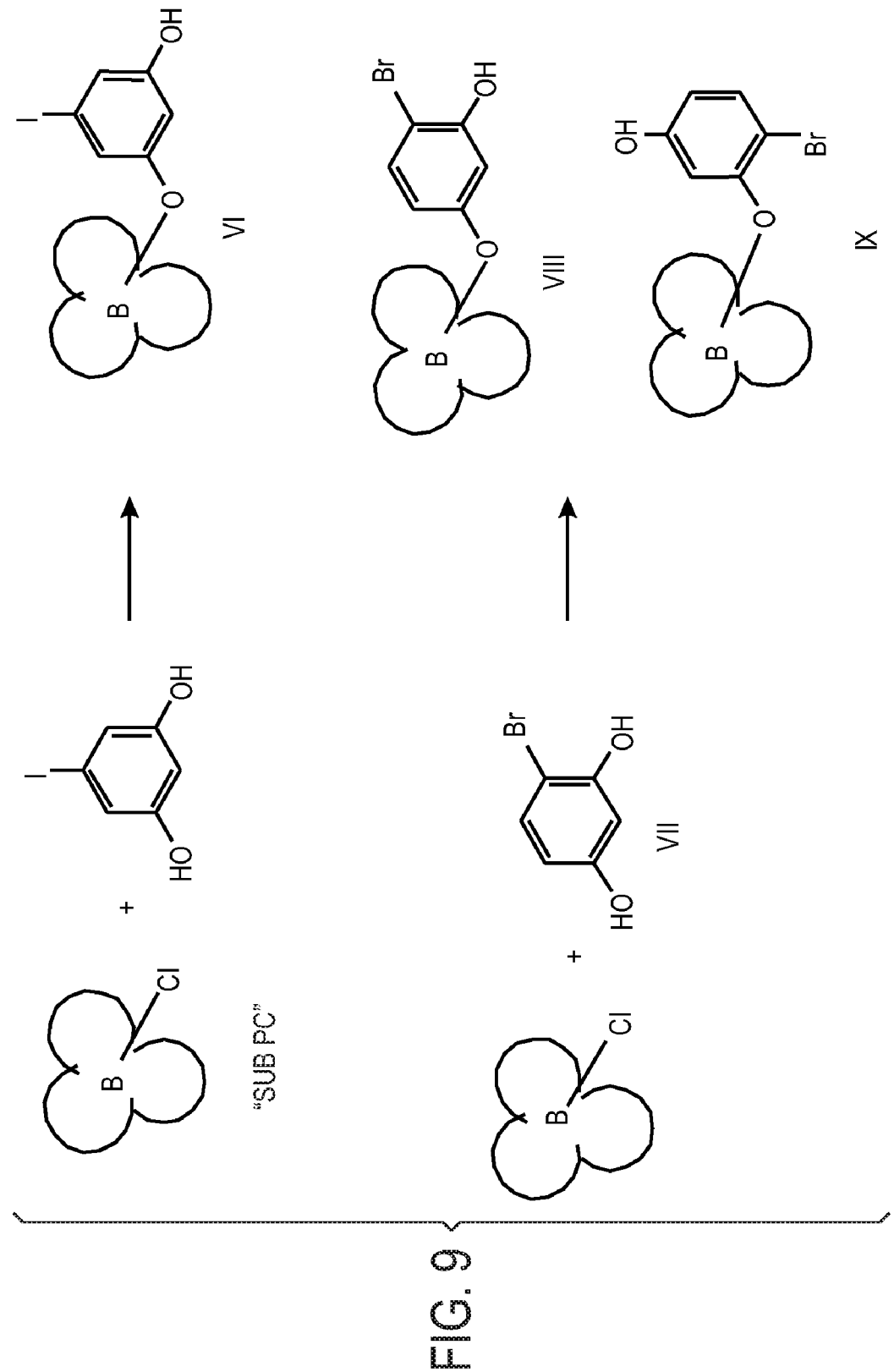
FIG. 9 depicts chemical reactions that may occur in preparation of a phenoxy compound, in accordance with aspects of the present disclosure.
Figure 10:
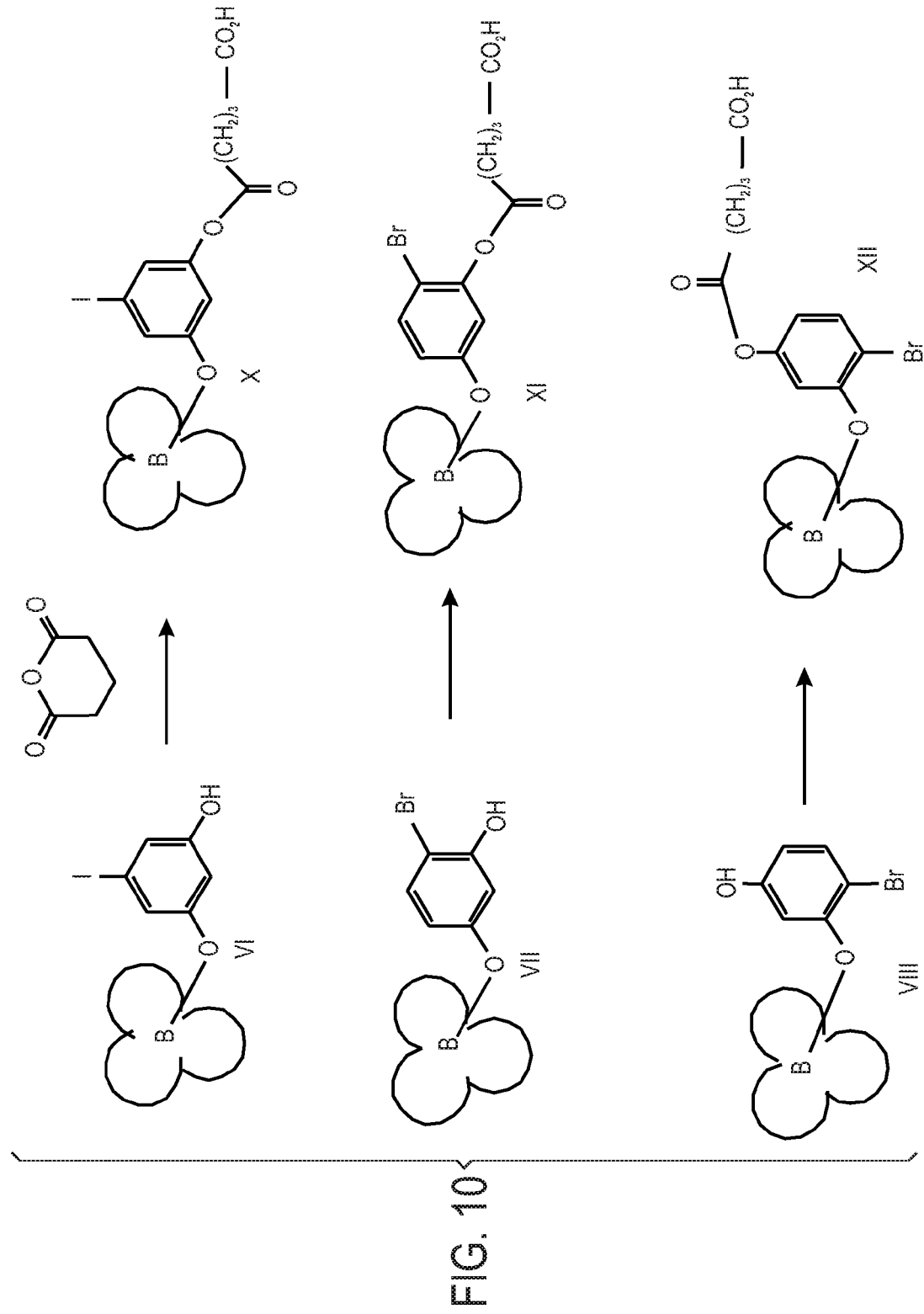
FIG. 10 depicts chemical reactions that may occur in accordance with aspects of the present disclosure.
Figure 11:
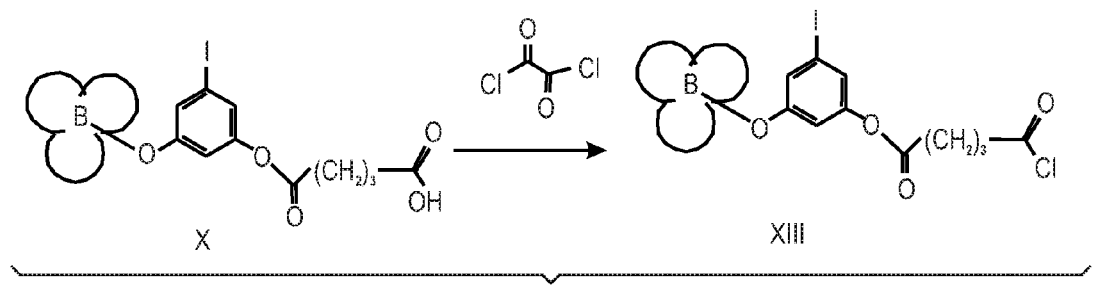
FIG. 11 depicts a chemical reaction that may occur in preparation of an acid chloride derivative of a dye, in accordance with aspects of the present disclosure.

Referring to FIG. 9, in a further implementation for making an acid substituted phenoxy sub-PC, the sub-PC chloride was initially reacted with substituted dihydroxy benzenes. As illustrated, the reaction of the sub-PC chloride with symmetrical dihydroxy benzenes, such as 5-iodo resorcinol, yielded a suitable phenoxy compound (VI). Unsymmetrical dihydroxy benzene, 6-bromo resorcinol (VII), provided a mixture of region isomers in high conversion favoring the 4-bromo isomer (VIII) over the 2-bromo isomer (IX), by ~7:3. These isomers were readily separated by silica gel chromatography. Turning to FIG. 10, the phenolic OH of these molecules was used to tether an aliphatic carboxylic acid by the ring opening reaction of glutaric anhydride. Essentially quantitative conversion to the desired acids were realized to provide compounds X, XI, and XII. The acids X, XI, and XII were converted to their corresponding acid chlorides using oxalyl chloride catalyzed with dimethyl formamide (DMF) in methylene chloride solution (FIG. 11).

The PVC resins with appended dye were prepared using a slight modification to standard PVC synthesis. In one such implementation of PVC synthesis the acid chloride (cinnamoyl chloride) was added in portions as a solid over four hours to a 50° C. solution of PVA in NMP. In an implementation of a reaction where the dye was appended to the PVC backbone, the acid chloride derivative of the dye (e.g., XIII of FIG. 11) was added as a solid when approximately 50% of the cinnamoyl chloride had been added. For smaller scale reactions the acid chloride of the dye was added as a solution in methylene chloride to improve the degree of functionalization of the PVA. Addition of the methylene chloride-dye solutions resulted in precipitation of the partially cinnamoylated PVA and did not redissolve over time. Therefore, in certain embodiments the PVA is at least 40-50% derivatized so as to maintain solubility of reaction mixture. Also, in certain implementations the acid chloride of the dyes may be used without purification. Neat polyvinyl cinnamate films have very low absorbance at 405 nm (<0.1 mm$^{-1}$). Films with doped dye typically were below 0.6 mm$^{-1}$ depending on the concentration of added dye. Attached dyes tended to have a slightly lower absorbance at 405 nm as compared to doped counterpart.

The optical data storage media described herein may be in a self-supporting form. Alternatively, the data storage media may be coated onto any support material having suitable properties. Examples of such suitable materials include, but are not limited to polymethyl(methacrylate) (PMMA), polycarbonate, poly(ethylene terephthalate), poly(ethylene naphthalate), polystyrene, or cellulose acetate. Suitable inorganic support materials, such as glass, quartz or silicon, may also be used in those embodiments where a support material is utilized.

In such embodiments, the surface of the support material may be treated in order to improve the adhesion of the optical data storage media to the support. For example, the surface of the support material may be treated by corona discharge prior to applying the optical data storage media. Alternatively, an undercoating, such as a halogenated phenol or partially hydrolyzed vinyl chloride-vinyl acetate copolymer can be applied to the support material to increase the adhesion of the storage media thereto.

Generally speaking, the optical data storage media described herein can be prepared by blending or otherwise combining the desired sensitizer, reactant, mediator (if desired) and polymer matrix. Proportions of these may vary over a wide range, and the proportions and methods of blending may be readily determined by those of ordinary skill in the art. For example, the sensitizer may be present in concentrations of from about 0.01 wt % to about 90 wt % and may be appended or otherwise attached to the polymer matrix, and the reactant may be present in concentrations of from about 2 wt % to about 80 wt %, or even up to about 90 wt %, based upon the total weight of the optical data storage media.

Examples 1-3

Microhologram Recording

Sample Preparation
Thin film samples for demonstrating microholograms and recording the reflectivity after writing microholograms were prepared as follows:

Example 1

Boron subphthalocyanine 3-iodo-5-glutarylphenoxide derivative (X)/Polyvinylcinnamate (PVCm). PVCm (0.870 g), 2 wt % of subphthalocyanine dye was dissolved in dichloroethane/methylene chloride solvent mixture (15 g, 2:8 v/v) as solvent. The solution will be filtered using a 0.45 µm filter, poured onto a glass rim (5 cm diameter) on a glass plate setup and dried on a hot plate maintained at about 45° C. for 5 hours and at about 75° C. overnight. After drying on a hot plate, the films will be removed from the glass plates and vacuum dried at 70° C. for overnight and later the films were dried in vacuum oven at 70° C. for 2 days.

Example 2

2 wt % appended Boron subphthalocyanine 3-iodo-5-glutarylphenoxide derivative (X) in polyvinylcinnamate (PVCm) backbone (XIV) was dissolved in dichloroethane/methylene chloride solvent mixture (15 g, 2:8 v/v) as solvent. The solution will be filtered using 0.45 µm filter, poured onto a glass rim (5 cm diameter) on a glass plate setup and dried on a hot plate maintained at about 45° C. for 5 hours and at about 75° C. overnight. After drying on a hot plate, the films will be removed from the glass plates and vacuum dried at 70° C. for overnight and later the films were dried in vacuum oven at 70° C. for 2 days.

Microhologram Recording

Example 3

A tunable optical parametric oscillator system operating at the 405 nm wavelength was used as a pulsed light source for recording and readout of micro-holograms. The light was focused into the medium sample using optics with numerical aperture (NA) of 0.16, resulting in the approximate dimensions of the recording volume to be 1.6×1.6×17 µm. The pulse energies used for micro-hologram recording was between 10 to 100 nano-Joules, which allowed one to achieve light intensity values of hundreds of $MW/cm^2$ to several $GW/cm^2$ at the focal spot of such focused recording beam. The readout of the light reflected from micro-holograms was done using the same beam attenuated by approximately 100-1000× with respect to the recording power.

The recording of µ-holograms in the optical data storage media was performed by two high-intensity counter-propagating pulsed recording beams focused and overlapped in the bulk of the recording medium to produce the intensity fringe pattern consisting of light and dark regions (fringes). The illuminated regions of the interference pattern undergo a change as described above, which results in a locally modified refractive index of the material, while the dark regions remain intact, thus creating a volume hologram. The present threshold optical data storage media is sensitive to a high-intensity light and is relatively inert to the low-intensity radiation. The power of the recording beam was adjusted so that the light intensity near the focal region of the beam is above the recording threshold (above which the change readily occurs), while remaining low outside the recordable region away from the focal spot of the beam, thus eliminating unintended media modification (recording or erasure).

During µ-hologram recording, the primary recording beam was split into the signal and the reference using a half-wave plate ($\lambda/2$) and a first polarization beam splitter. The two secondary beams were steered to the sample in a counter-propagating geometry and were focused to overlap in the bulk of the optical data storage media by identical aspheric lenses with a numerical aperture (NA) of up to 0.4. The polarization of both beams is converted into circular polarization—with two quarter-wave plates ($\lambda/4$) to ensure that the beams interfere to create a high-contrast fringe pattern. The sample and the signal beam lens were mounted on closed-loop three-axis positioning stages with 25 nm resolution. A position-sensitive detector on the reference side of the sample was used to align the signal lens for optimized overlap of the focused signal and reference beams in the medium, and thus, optimized recording.

A variable attenuator and the half-wave plate/PBS assembly were used to control the power level during recording and/or read-out. This allows the µ-holographic recording characteristics of the optical data storage media to be measured as a function of the recording power and/or energy. This functional dependence distinguishes between a linear optical data storage medium/recording, where the strength of the recorded hologram is largely defined by the total amount of light energy received by the medium, but is independent of the light intensity, and a non-linear, threshold optical data storage medium/recording, where the recording efficiency is highly dependent upon the intensity of the light. In a linear medium, a small exposure results in a low-strength hologram, which gradually grows with higher exposures. In contrast, in a non-linear, threshold medium, recording is only possible with intensity exceeding the threshold value.

During read-out, the signal beam was blocked, and the reference beam was reflected by the λ-holograms in the direction opposite to the incident direction. The reflected beam was coupled out from the incident beam path using the quarter-wave plate and a second polarizing beam splitter, and was collected on a calibrated photodiode in a confocal geometry to provide an absolute measure of the diffraction efficiency. By translating the sample with respect to the readout optics, it is possible to obtain a 3D profile of a micro-hologram diffraction response and evaluate dimensions of a micro-hologram.

Figure 12:
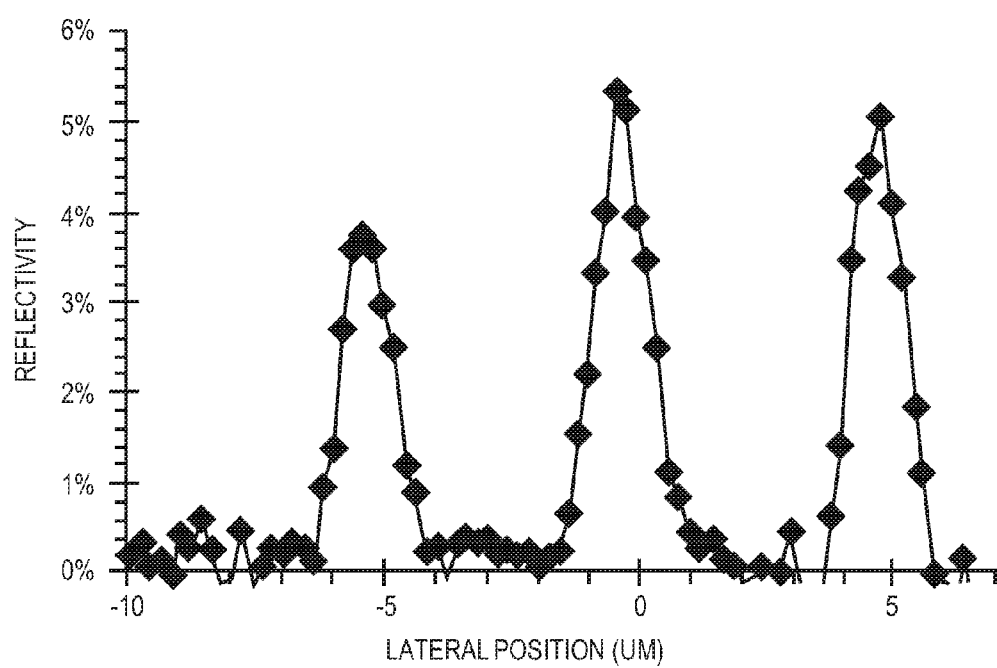
FIG. 12 is a graphical depiction of the reflectivity of an array of micro-holograms recorded in one embodiment of the optical data storage media.
Figure 13:
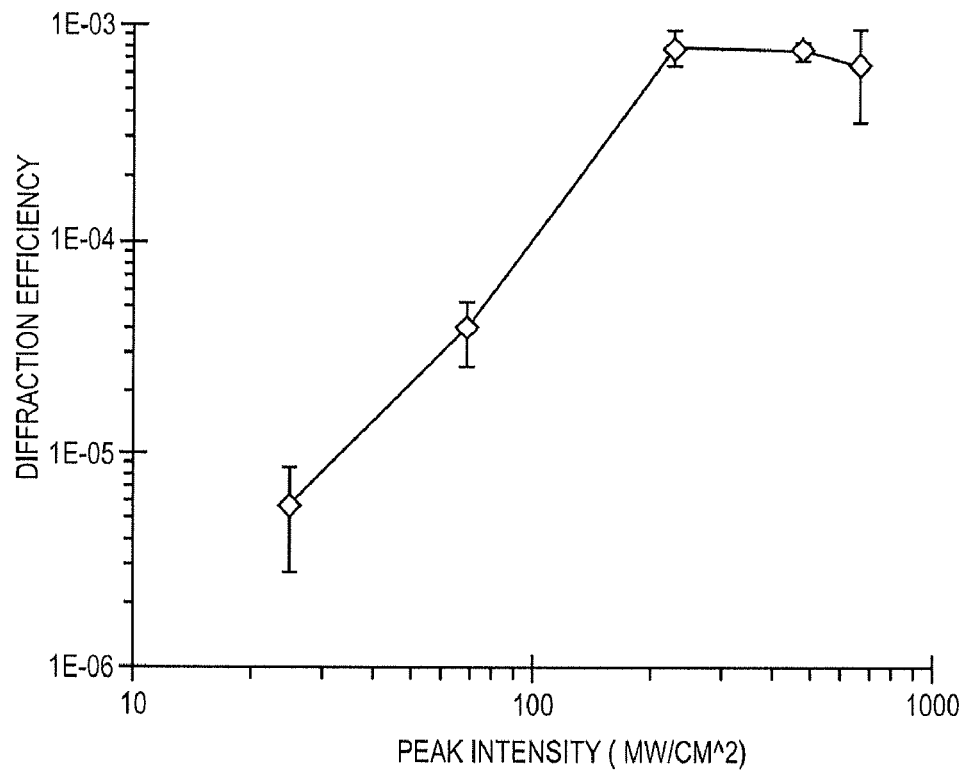
FIG. 13 is a graphical depiction of the diffraction efficiency of one embodiment of the optical data storage medium as a function of intensity for a fixed recording fluence of 60 J/cm$^2$.

FIG. 12 shows an experimentally measured reflectivity of a series of μ-holograms vs. lateral position of the sample with respect to the readout beam for the optical data storage media prepared according to the present disclosure. The peaks occur at the positions of the sample when the reference beam is centered on one of the micro-holograms in the array. FIG. 13 shows a dependence of the micro-hologram reflectivity recorded with the same fluence but varied intensity in the optical data storage medium prepared according to the present disclosure, demonstrating the threshold functionality of the material: material recording sensitivity dramatically increases when the intensity exceeds the threshold value (~100-200 MW/cm$^2$), while for the sub-threshold intensities, the recorded hologram reflectivity is essentially zero (within the detection limit of the system).

The diffraction efficiency in these implementations is expected to be from about 0.03% to about 0.26%, depending on the recording fluence.

Example 4

Synthesis of Polyvinyl Cinnamates with Attached Sub-PC Dyes (XIV)

Figure 14:
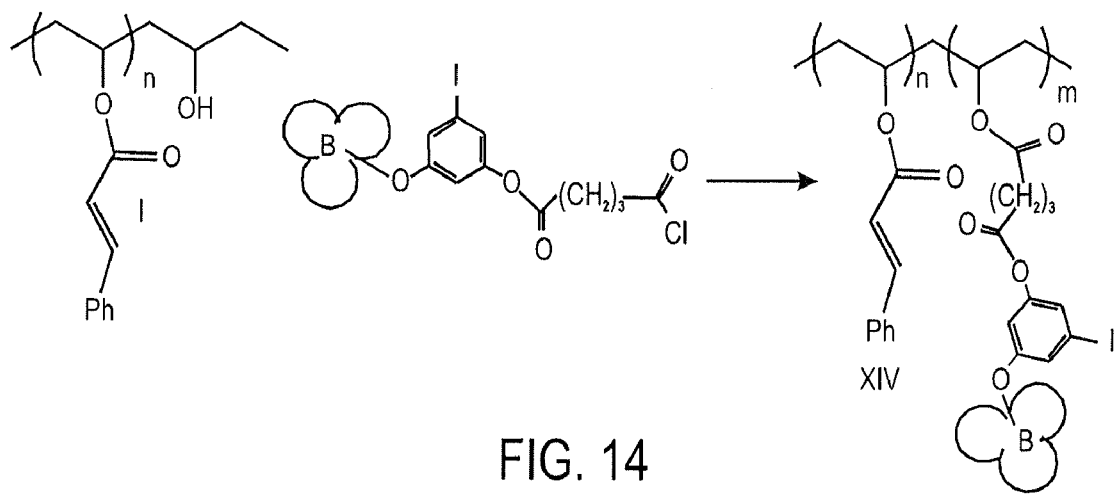
FIG. 14 depicts a chemical reaction that may occur in preparation of polyvinyl cinnamates, in accordance with aspects of the present disclosure.

Turning to FIG. 14, polyvinyl alcohol (1.50 g, 31.3 mmol, Aldrich 88% hydrolysed) was dissolved in 25 mL of NMP at 80° C., complete dissolution takes about 2 hours. This solution was cooled to 50° C. and cinnamoyl chloride (12.0 g, 72.2 mmol) was added in portions over 3-4 hours. The acid chloride of the dye was added as a solid or solution in methylene chloride about half way through the cinnamoyl chloride addition. Upon completion of the cinnamoyl chloride addition the solution was allowed to cool to room temperature and precipitated into methanol. The resulting solid was redissolved in methylene chloride and filtered. This solution was reprecipitated into methanol, collected by filtration and dried at 60 C under vacuum for 12 hours. The percent incorporated dye was determined by GPC and the net weight percent of dye was determined by UV spectroscopy.

Example 5

General Procedure for Preparation of Boron Subphthalocyanine Phenoxide

Boron Subphthalocyanine 3-iodo-5-hydroxyphenoxide(VI)

A mixture of 1.28 g (0.003 mole) of boron subphthalocyanine chloride, 2.80 g (0.0119 mole) 4-iodoresorcinol in 50 ml of toluene was placed in a 250 ml round bottom flask equipped with a magnetic stir bar, a condenser/nitrogen bypass. The mixture was heated in an oil bath to reflux for 48 hours. The mixture was then cooled and the toluene removed under reduced pressure. To the residue was added 200 ml of methylene chloride and stirred for about 15-30 min. The remaining gummy solid was redisolved in 600 mL of ethyl acetate and filtered to remove some insoluble material. The filtrate was then washed three times with water (100 ml each), dried over anhydrous magnesium. To the filtered solution was added 15 g of silica gel and the solvent evaporated under reduced pressure until dried. The crude product/silica gel was loaded onto a load column and the crude product purified by preparative LC on a CombiFlash Companion by Isco, Inc. Column used was a 120 gm RediSep Silica Gel normal phase disposable columns by Teledyne Isco, Inc. Run length: 35 min with flow rate at 85 ml/min. Chloroform/EtOAc was used as eluting solvent: 100% CHCl$_3$ for 33 min and EtOAc ramp to 85% till end. RT of product was 25 min. Pure fractions were combined and concentrated. Yield: 1.13 g (59.8%) $^1$HNMR: 4.72 ppm (t, 1H), 5.10 ppm (t, 1H); 6.39 ppm (t, 1H); 8.01 ppm (m, 6H); 8.85 ppm (m, 6H); 9.42 ppm (s, 1H).

Boron Subphthalocyanine 3-hydroxy-2(4)-bromophenoxide(VIII)

Same procedure as above only refluxed for 24 hours. Product is a 70:30 mixture of 2-bromo and 4-bromo isomers respectively. Preparative LC was used to purify the crude mixture and separate the isomers. It was carried out on a CombiFlash Companion by Isco, Inc. Column used was a 120 gm RediSep Silica Gel normal phase disposable columns by Teledyne Isco, Inc. Run length: 28 min. with flow rate at 85 ml/min. Chloroform/EtOAc were used as eluting solvent: 100% CHCl$_3$ for 13 min and EtOAc ramp to 10% till end of run. Boron subphthalocyanine 3-hydroxy-4-bromophenoxide (major isomer, RT=14 min): Yield: 34.2% yield. $^1$HNMR: 4.90 ppm (dd, 1H); 5.16 ppm (s, 1H); 5.17 ppm (d, 1H); 6.81 ppm (d, 1H); 7.93 ppm (m, 6H); 8.87 (m, 6H).

Boron subphthalocyanine 3-hydroxy-2-bromophenoxide (minor isomer, RT=24 min): Yield: 16.4% yield. $^1$HNMR: 4.72 ppm (d, 1H); 6.02 ppm (dd, 1H); 6.75 ppm (d, 1H); 8.03 ppm (m, 6H); 8.85 ppm (m, 6H); 9.30 ppm (s, 1H).

Example 6

General Procedure for Preparation of Glutaric Acid Boron Subphthalocyanine Phenoxide Boron Subphthalocyanine 3-iodo-5-glutarylphenoxide Derivative (X)

A mixture of 1.56 g (0.00247 mole) of boron subphthalocyanine 3-iodo-5-hydroxyphenoxide (VI), 19.7 g (0.173 mole) of glutaric anhydride, 40 ml of DMF, and 7.82 g (0.0988 mole) pyridine was placed in a 100 ml round bottom flask equipped with a magnetic stir bar and capped with a rubber septum. The flask was placed in a pre-heated oil both @80° C. for 2.5 hours. The reaction mixture was cooled and poured into 150 ml of water and stirred for about 20 min. To the aqueous mixture was added 200 ml of methylene chloride to extract the product. The methylene chloride solution was washed repeatedly with 150 ml water (~10×) and one time with dilute HCl and then water again to remove DMF and pyridine. The methylene chloride solution was dried with anhydrous magnesium sulfate and concentrated under reduce pressure. The product was further dried in vac. oven at room temperature overnight. Yield: 1.65 g (89.8%) $^1$HNMR: 2.15 ppm (m, 2H); 2.58 ppm (t, 2H); 2.64 ppm (t, 2H); 4.94 ppm (t, 1H); 5.82 ppm t, 1H); 6.68 ppm (t, 1H); 7.94 ppm (m, 6H), 8.88 ppm (m, 6H).

UV-Vis: ϵ@405 nm: 67.5; ϵ@λmax: 68,000

Boron Subphthalocyanine
2-bromo-5-glutarylphenoxide Derivative (XII)

Same procedure was used as described above. Yield: 76.4% $^1$HNMR: 2.16 ppm (m, 2H); 2.60 ppm (t, 2H); 2.65 ppm (t, 2H); 5.05 ppm (d, 1H); 6.27 ppm (dd, 1H), 7.94 ppm (m, 6H); 8.88 ppm (m, 6H).

Boron Subphthalocyanine
4-bromo-5-glutarylphenoxide Derivative (XI)

Same procedure as described above only the reaction mixture was stirred overnight at room temperature. Yield: 86% $^1$HNMR: 2.15 ppm (quintet, 2H); 2.61 ppm (quartet, 4H); 5.13 ppm (d, 1H); 5.26 ppm (dd, 1H); 6.93 ppm (d, 1H); 7.93 ppm (m, 6H); 8.87 ppm (m, 6H). NMR showed also 9.9% of starting material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. While only certain features of the invention have been illustrated and described herein, many modifications and changes will occur to those skilled in the art. Although individual embodiments are discussed, the present invention covers all combinations of all of those embodiments. It is, therefore, to be understood that the appended claims are intended to cover all such modifications and changes as fall within the true spirit of the invention.

The invention claimed is:

1. A composition comprising:
   a polymer matrix;
   a reactant disposed within the polymer matrix and capable of undergoing a photochemical change upon excitation; and
   a non-linear sensitizer comprising one or more subphthalocyanine reverse saturable absorbers chemically bonded to the polymer matrix, wherein the non-linear sensitizer causes a refractive index change to the reactant upon exposure to one or more wavelengths of radiation.

2. The composition of claim 1, wherein the one or more wavelengths of radiation comprise about 380 nm to about 450 nm.

3. The composition of claim 1, wherein the non-linear sensitizer causes an upper triplet energy transfer upon exposure to the one or more wavelengths of radiation and the refractive index change occurs in response to the upper triplet energy transfer.

4. The composition of claim 1, wherein the one or more subphthalocyanine reverse saturable absorbers comprise boron subphthalocyanine 3-iodo-5-glutarylphenoxide derivative (X), Boron subphthalocyanine 4-bromo-5-glutarylphenoxide derivative (XI), or Boron subphthalocyanine 2-bromo-5-glutarylphenoxide derivative (XII).

5. The composition of claim 1 wherein the non-linear sensitizer comprises an energy transfer threshold dye.

6. The composition of claim 1 wherein the non-linear sensitizer is chemically bonded to the polymer matrix via one or more covalent bonds.

7. The composition of claim 1, wherein the reactant comprises a stilbene derivative, a cinnamate, a cinnamate derivative, a cinnamamide derivative, or a combination of these.

8. The composition of claim 7, wherein the cinnamate, cinnamate derivative or cinnamamide derivative comprises polyvinyl cinnamate (PVCm), polyvinyl 4-chlorocinnamate (PVClCm), polyvinyl 4-methoxycinnamate (PVMeOCm), (2E,2'E)-((1S,2S)-cyclohexane-1,2-diyl)bis(3-phenylacrylate), (2E,2'E)-(1S,2S)-cyclohexane-1,2-diyl)bis(4-chlorophenylacrylate), (2E,2'E)-(1S,2S)-cyclohexane-1,2-diyl) bis(4-methoxy phenyl)acrylate), (2E,2'E)-N,N'-((1S,2S)-cyclohexane-1,2-diyl)bis(3-phenyl)acrylamide (2E,2'E)-N,N'-((1S,2S)-cyclohexane-1,2-diyl)bis(3-(4-chlorophenyl) acrylamide), (2E,2'E)-N,N'-((1S,2S)-cyclohexane-1,2-diaryl)bis(3-(4-methoxyphenyl)acrylamide, or combinations of these.

9. The composition of claim 1, wherein the polymer matrix comprises a polyvinyl composition.

10. The composition of claim 1, further comprising a mediator disposed within the polymer matrix and capable of transferring energy between the non-linear sensitizer and the reactant.

11. The composition of claim 1, wherein the reactant is chemically bonded to the polymer matrix.

12. An optical data storage medium comprising:
    a polymer matrix;
    a reactant capable of undergoing a photochemical change upon excitation, thereby causing a refractive index change; and
    a non-linear sensitizer comprising one or more subphthalocyanine reverse saturable absorbers capable of causing excitation of the reactant when the reactant is exposed to one or more wavelengths of radiation, wherein the non-linear sensitizer is chemically bonded to the polymer matrix.

13. The optical data storage medium of claim 12 wherein one or both of the reactant and the non-linear sensitizer are covalently bonded to the polymer matrix.

14. The optical data storage medium of claim 12, wherein the optical data storage medium is capable of storing microholographic data.

15. The optical data storage medium of claim 12, wherein the polymer matrix comprises one or more poly(alkyl methacrylates), poly(alkyl acrylates), polystyrenes, polycarbonates, poly acrylates, poly(vinylidene chloride), poly(vinyl acetate), or combinations thereof.

16. The optical data storage medium of claim 12, wherein the non-linear sensitizer is derivatized within the polymer matrix at a loading level up to 10 wt %.

17. An optical data storage medium comprising:
    a polymer matrix having a plurality of microholograms formed at different lateral positions and depths; and
    an energy transfer dye comprising one or more subphthalocyanine reverse saturable absorbers capable of absorbing actinic radiation at a wavelength, wherein the energy transfer dye is chemically bonded to the polymer matrix.

18. The optical data storage medium of claim 17, wherein the energy transfer dye has a non-linear light intensity response.

19. The optical data storage medium of claim 17, wherein the polymer matrix is photoreactive due to the presence of a reactant capable of undergoing a photochemical change upon excitation, thereby causing refractive index changes to capture refractive index patterns that constitute microholograms.

20. The optical data storage medium of claim 17, wherein the wavelength is between about 380 nm to about 450 nm.

21. The optical data storage medium of claim 17, wherein the optical data storage medium is provided as a disk.

* * * * *